(12) United States Patent
Bai et al.

(10) Patent No.: US 9,565,129 B2
(45) Date of Patent: Feb. 7, 2017

(54) RESOURCE PROVISIONING PLANNING FOR ENTERPRISE MIGRATION AND AUTOMATED APPLICATION DISCOVERY

(71) Applicant: International Business Machines Corporation, Armonk, NY (US)

(72) Inventors: Kun Bai, Elmsford, NY (US); Jinho Hwang, Ossining, NY (US); Jill L. Jermyn, New York, NY (US); Michael E. Nidd, Zurich (CH); Michael Tacci, Downingtown, PA (US); Maja Vukovic, New York, NY (US)

(73) Assignee: International Business Machines Corporation, Armonk, NY (US)

( * ) Notice: Subject to any disclaimer, the term of this patent is extended or adjusted under 35 U.S.C. 154(b) by 156 days.

(21) Appl. No.: 14/501,311

(22) Filed: Sep. 30, 2014

(65) Prior Publication Data

US 2016/0094477 A1    Mar. 31, 2016

(51) Int. Cl.
*G06F 15/177*    (2006.01)
*H04L 12/915*    (2013.01)

(52) U.S. Cl.
CPC .................. *H04L 47/786* (2013.01)

(58) Field of Classification Search
CPC .... H04L 29/12066; H04L 67/16; H04L 67/20; H04L 41/046; H04L 41/12; H04L 41/5058; H04L 61/1511; H04L 9/32; G06F 15/173
USPC ........................................................ 709/226
See application file for complete search history.

(56) References Cited

U.S. PATENT DOCUMENTS

| | | | |
|---|---|---|---|
| 6,286,047 B1 | 9/2001 | Ramanathan et al. | |
| 7,346,682 B2 | 3/2008 | Basani et al. | |
| 7,349,348 B1 | 3/2008 | Johnson et al. | |
| 7,657,545 B2 | 2/2010 | Bird | |
| 8,477,635 B2 | 7/2013 | Sebastian et al. | |
| 2009/0089078 A1* | 4/2009 | Bursey | G06Q 10/101 705/300 |
| 2010/0319060 A1 | 12/2010 | Aiken et al. | |
| 2011/0258634 A1 | 10/2011 | Bonilla et al. | |
| 2012/0072903 A1* | 3/2012 | Joukov | G06F 8/63 717/175 |
| 2012/0331152 A1 | 12/2012 | Tatsubori et al. | |
| 2013/0019253 A1 | 1/2013 | Joseph et al. | |
| 2013/0263131 A1* | 10/2013 | Beda, III | G06F 8/63 718/1 |
| 2013/0304925 A1 | 11/2013 | Ferris et al. | |

(Continued)

OTHER PUBLICATIONS

Zhang, J., et al., "EnCore: Exploiting System Environment and Correlation Information for Misconfiguration Detection", ASPLOS '14, Mar. 1-5, 2014, pp. 687-700, Salt Lake City, Utah.

(Continued)

*Primary Examiner* — Tauqir Hussain
(74) *Attorney, Agent, or Firm* — Scully, Scott, Murphy & Presser, P.C.; Louis J. Percello, Esq.

(57) ABSTRACT

A method and a system may automatically compute optimized target resources and identify configurations given discovered source properties and dependencies of machines, while prioritizing performance in the target environment. An algorithm and/or tools for programmatically identifying and locating business application instances in an infrastructure, based on weighted similarity metric may be also provided.

20 Claims, 14 Drawing Sheets

(56) References Cited

U.S. PATENT DOCUMENTS

| | | | |
|---|---|---|---|
| 2014/0129876 A1 | 5/2014 | Addepalli et al. | |
| 2016/0056996 A1* | 2/2016 | Anand | G06F 9/5061 |
| | | | 370/221 |

OTHER PUBLICATIONS

Steiner, M., et al., "Network-Aware Service Placement in a Distributed Cloud Environment", SIGCOMM'12, Aug. 13-17, 2012, pp. 73-74, Helsinki, Finland.

Srikantaiah, S., et al., "Energy Aware Consolidation for Cloud Computing", Proceedings of the 2008 Conference on Power Aware Computing and Systems, HotPower'08, Dec. 2008, 10 pages, Berkeley, CA, USENIX Association.

Ng, A. Y., et al., "On Spectral Clustering: Analysis and an algorithm", Advances in neural information processing systems, Dec. 3-8, 2001, vol. 2, pp. 849-856.

Miao, R., et al., "NIMBUS: Cloud-scale Attack Detection and Mitigation", SIGCOMM'14, Aug. 17-22, 2014, 2 pages. Chicago, IL.

Meng, X., et al., "Improving the Scalability of Data Center Networks with Traffic-aware Virtual Machine Placement", INFOCOM, Proceedings IEEE, Mar. 2010, pp. 1-9.

Marzolla, M., et al., "Server Consolidation in Clouds through Gossiping", Technical Report UBLCS-2011-01 Jan. 2011 (Revised May 2011), 15 pages.

Kundu, S., et al., "Modeling Virtualized Applications using Machine Learning Techniques", VEE'12, Mar. 3-4, 2012, 12 pages, London, England, UK.

Kimbrel, T., et al., "Dynamic application placement under service and memory", Proceedings of the 4th International Conference on Experimental and Efficient Algorithms, WEA'05, May 2005, pp. 391-402, Berlin, Heidelberg, Springer-Verlag.

Keller, E., et al., "Live Migration of an Entire Network (and its Hosts)", Hotnets '12, Oct. 29-30, 2012, 6 pages, Seattle, WA, USA.

Herodotou, H., et al., "No One (Cluster) Size Fits All: Automatic Cluster Sizing for Data-intensive Analytics", SOCC'11, Oct. 27-28, 2011, 14 pages, Cascais, Portugal.

Hajjat, M., et al., "Cloudward Bound: Planning for Beneficial Migration of Enterprise Applications to the Cloud", SIGCOMM'10, Aug. 30-Sep. 3, 2010, 12 pages, New Delhi, India.

Goudarzi, H., et al., "Energy-Efficient Virtual Machine Replication and Placement in a Cloud Computing System", Cloud Computing (CLOUD), 2012 IEEE 5th International Conference, Jun. 2012, pp. 750-757.

Chiang, R. C., "Matrix: Achieving Predictable Virtual Machine Performance in the Clouds", 11th International Conference on Autonomic Computing (ICAC 14), Jun. 2014, pp. 45-56, Philadelphia, PA, USENIX Association.

Chang, H., et al., "Robust path-based spectral clustering", Pattern Recognition, ScienceDirect, Accepted Apr. 23, 2007, 13 pages, Elsevier.

Al-Kiswany, S., et al., "VMFlock: Virtual Machine Co-Migration for the Cloud", Proceedings of the 20th International Symposium on High Performance Distributed Computing, HPDC '11, New York, NY, USA: ACM, Jun. 8-11, 2011, pp. 159-170.

Bai, K., et al., "What to discover before migrating to the cloud," Integrated Network Management (IM 2013), 2013 IFIP/IEEE International Symposium, May 2013, pp. 320-327.

Biran, O., et al.,"A stable network-aware vm placement for cloud systems", Cluster, Cloud and Grid Computing (CCGrid), 2012 12th IEEE/ACM International Symposium, May 2012, pp. 498-506.

Blondel, V. D. et al., "Fast unfolding of communities in large networks", Journal of Statistical Mechanics: Theory and Experiment, Oct. 2008, (10), 12 pages.

Alicherry, M., et al., "Network aware resource allocation in distributed clouds", INFOCOM, 2012 Proceedings IEEE, Mar. 2012, pp. 963-971.

Softlayer, printed on Jan. 21, 2015, 2 pages, https://www.softlayer.com/.

Jayasinghe, D. et al., "Improving Performance and Availability of Services Hosted on IaaS Clouds with Structural Constraint-Aware Virtual Machine Placement", Services Computing (SCC), 2011 IEEE International Conference, Jul. 2011, pp. 72-79.

IBM, "IT Infrastructure Discovery", Analytics for Logical Dependency Mapping (ALDM), printed on Jan. 21, 2015, 2 pages, http://www.ibm.com/services/ALDM/.

Urgaonkar, B., et al., "Resource overbooking and application profiling in shared hosting platforms", SIGOPS Oper. Syst. Rev., Dec. 2002, 36(SI) pp. 239-254.

Verizon, "The Digital Dividend: First-Mover Advantage", Published: Sep. 26, 2014, 24 Pages, Harvard Business School Publishing.

* cited by examiner

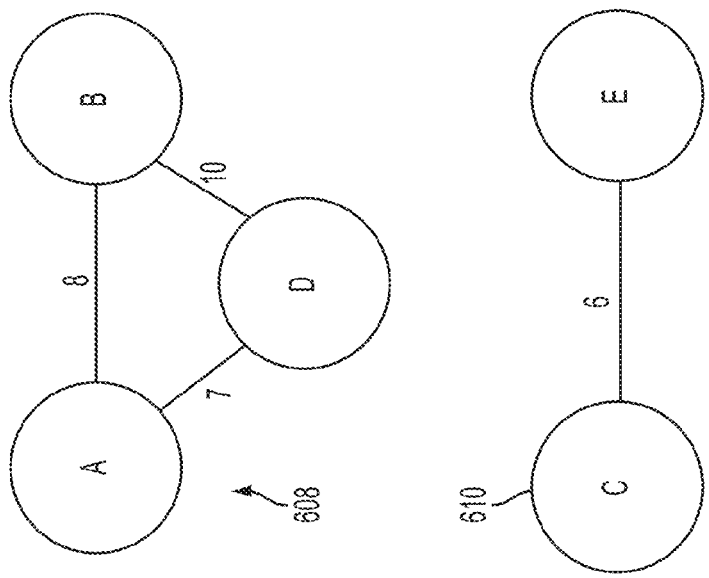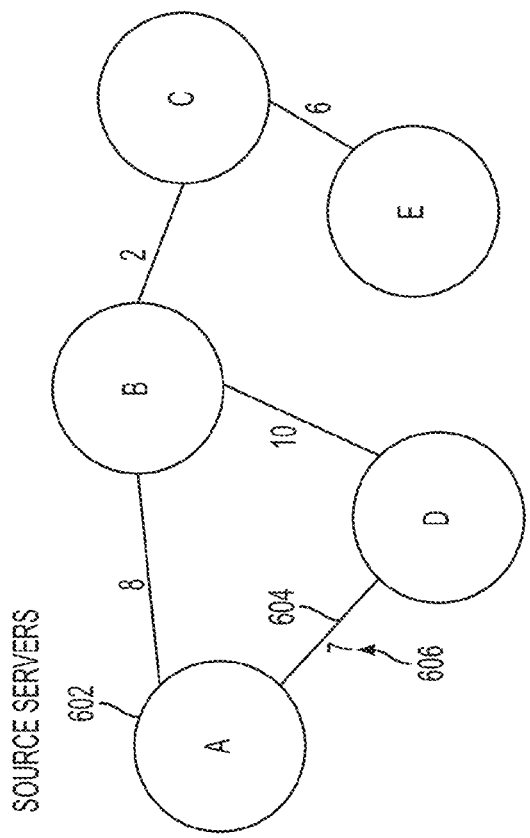
FIG. 6

```
<Host id_mopbz171166="mopbz171166" id_tileflow="tileflow" xmlChanged="true">        ◄── 1002
  <Group id_mopbz171166="N-82" id_tileflow="N-115" name="Storage Devices" type=
    <Install class="BDEV" id_mopbz171166="N-83" id_tileflow="N-116" name="VMwar
      <Service id_mopbz171166="N-84" id_tileflow="N-117" nports ="*" protocol="bdev"
    </Install>
  </Group>
  <Install class="FS" id_mopbz171166="P-118" id_tileflow="P-129" status="INFERRED
    <Service id_mopbz171166="P-119" id_tileflow="P-130" nports="*" protocol="fs" sta
      <GObject alias="C" id_mopbz171166="P-120" id_tileflow="P-131" status="INFER
        <GObject alias="cygwin" id_mopbz171166="P-121" id_tileflow="P-132" status=
          <GObject alias="usr" id_mopbz171166="P-122" id_tileflow="P-133" status="
            <GObject alias="sbin" id_mopbz171166="P-61" id_tileflow="P-81" status=
          </GObject>
        </GObject>
      </GObject>
    </Service>
  </Install>
  <Install class="NAS" id_mopbz171166="N-80" id_tileflow="N-113" name="Shares" su        ◄── 1002
    <Service id_mopbz171166="N-81" id_tileflow="N-114" ports="138 139 445" protoco
    <Association refid_mopbz171166="N-88" refid_tileflow="N-121" refurl_mopbz17
    <Association refid_mopbz171166="N-88" refid_tileflow="N-121" refurl_mopbz17
    <RemovedElements>
      <Association refurl="fs://mopbz171166/C/TEMP/XMLs" refid="N-88"/>
      <Association refurl="fs://mopbz171166/C/inetpub/AppFabric" refid="P-62"/>
      <Association refurl="fs://mopbz171166/C/smbshare" refid="N-88"/>
      <Association refurl="fs://mopbz171166/E" refid="N-96"/>
    </RemovedElements>
    <AddedElements>
      <Association refurl="host://9.17.175.253:ignore" refid="P-15" direction="in"/>
    </AddedElements>
  </Service>
```

FIG. 10

```
<Host id=InOutDiff_1408618726015">
  <DiffDetail>
    <IncludeCommon HostID="mopbz171166"/>
    <IncludeCommon HostID="tileflow"/>
    <ExcludeCommon HostID="inmbz1165"/>
    <ExcludeCommon HostID="adminib-qob08t9"/>
  </DiffDetail>
  <Install class="FS" id="Ignored_InOutDiff_1408618726015" status="INFERRED">
    <Service id="Ignored_InOutDiff_1408618726015" nports="*" protocol="fs" status="1
      <GObject alias="C" id="Ignored_InOutDiff_1408618726015" status="INFERRED"
        <GObject alias ="cygwin" id="Ignored_InOutDiff_1408618726015" status="INFER
          <GObject alias="usr" id="Ignored_InOutDiff_1408618726015" status="INFER
            <GObject alias="sbin" id="Ignored_InOutDiff_1408618726015" status="INF
            </GObject>
          </GObject>
        </GObject>
      </GObject>
    </Service>
  </Install>
  <Install class="NA" directory="c:\cygwin\usr\sbin" id="Ignored_InOutDiff_1408618726
    <Service id="Ignored_InOutDiff_1408618726015" ports="22" protocol="sshd"/>
    <Association refid="Ignored_InOutDiff_1408618726015" refurl="fs://InOutDiff_1408
  </Install>
  <LAN aliases ="InOutDiff_1408618726015 9.17.175.173 9.212.156.166 tileflow uuid-5
</Host>
```

FIG. 12

RESOURCE PROVISIONING PLANNING FOR ENTERPRISE MIGRATION AND AUTOMATED APPLICATION DISCOVERY

FIELD

The present application relates generally to computers, and computer applications, and more particularly to data center migration and application discovery.

BACKGROUND

Enterprises are increasingly moving their Information Technology (IT) infrastructures to the Cloud, driven by the promise of low-cost access to ready-to-use, elastic resources. Existing migration approaches typically replicate source resources and configurations on the target site, making it challenging to optimize the resource usage (for reduced cost with same or better performance) or cloud-fit configuration (no misconfiguration) after migration. The responsibility of reconfiguring the target environment after migration is often left to the users, who, as a result, may not reap the benefits of reduced cost and improved performance in the Cloud.

For instance, the promise of elastic, resilient, and flexible Cloud infrastructures, often associated with a pay-per-use model, is driving enterprises to migrate their legacy IT infrastructure. From startups to large enterprises with legacy data centers to government agencies, organizations with data centers of all sizes and requirements are interested in taking advantage of the cost savings and flexibility that the Cloud can offer. The question for enterprises of whether migration to the Cloud is the right strategy is now turning into the question of how to leverage the Cloud's abundance of resources for company benefit.

Existing migration processes typically move a site's source environment to a target environment of the user's choice, with post-configuration and optimization of the target left to the user. As a result, the benefits of a Cloud infrastructure may not reaped by consumers, since the target setup has not been customized to the Cloud environment. Post-configuration and optimization is often associated with high cost, especially for large data centers, due to the hands-on expertise that is required and the time necessary for manual execution of many of these activities.

BRIEF SUMMARY

A method of resource provisioning planning, in one aspect, may comprise receiving source site data. The source site data may comprise parameters associated with a source site. The source site may comprise information technology infrastructure of an enterprise. The information technology infrastructure may comprise at least a plurality of servers and a plurality of applications. The method may also comprise discovering network dependencies between the plurality of servers of the source site. The method may also comprise identifying one or more server misconfigurations. The method may also comprise determining potential server consolidation. The method may also comprise determining a target platform for migrating the plurality of servers. The method may further comprise mapping each of the plurality of servers to a virtual machine of a plurality of virtual machines subject to resource constraints of the servers and the virtual machines. The method may further comprise clustering the virtual machines based on network dependencies of the servers mapped to the virtual machines. The method may further comprise determining whether an existing target server can fit a candidate cluster. Responsive to determining that the existing target server can fit the candidate cluster, the method may also comprise placing the candidate cluster on the existing target server. Responsive to determining that the existing target server cannot fit the candidate cluster, the method may further comprise selecting a new target server to fit the candidate cluster with minimum cost. The method may also comprise repeating the determining, one or more of the placing and the selecting, for a next candidate cluster.

A system of resource provisioning planning, in one aspect, may comprise a computer processor and a storage device operable to store source site data comprising parameters associated with a source site, the source site comprising information technology infrastructure of an enterprise, the information technology infrastructure comprising at least a plurality of servers and a plurality of applications. The computer processor may be operable to discover network dependencies between the plurality of servers of the source site. The computer processor may be further operable to identify one or more server misconfigurations. The computer processor may be further operable to determine potential server consolidation. The computer processor may be further operable to determine a target platform for migrating the plurality of servers. The computer processor may be further operable to map each of the plurality of servers to a virtual machine of a plurality of virtual machines subject to resource constraints of the servers and the virtual machines. The computer processor may be further operable to cluster the virtual machines based on network dependencies of the servers mapped to the virtual machines. The computer processor may be further operable to determine whether an existing target server can fit a candidate cluster. Responsive to determining that the existing target server can fit the candidate cluster, the computer processor may be further operable to place the candidate cluster on the existing target server. Responsive to determining that the existing target server cannot fit the candidate cluster, the computer processor may be further operable to select a new target server to fit the candidate cluster with minimum cost. The computer processor may be further operable to repeat the determining of whether an existing target server can fit a candidate cluster, one or more of the placing and the selecting, for a next candidate cluster.

In another aspect, a method of automating business application discovery may be provided. The method may comprise receiving a system description data associated with a server of a plurality of servers in an information technology infrastructure of an enterprise, for each of the plurality of servers. The method may also comprise determining a similarity measure between a pair of the plurality of servers comprising a first server and a second server, by analyzing the system description data associated with the first server and the second server. The analyzing may comprise at least: assigning weights to sections of the system description data; determining a number of common elements between the system description data associated with the first server and the second server; and using the weights as multipliers for the common elements contained in the respective sections, wherein the similarity measure is determined based on the weighted common elements occurring in the system description data associated with the first server and the second server. The method may also comprise grouping the plurality of servers into a plurality of groups based on the similarity measure and at least a greedy algorithm. Migration of the plurality of servers may be planned based at least on the plurality of groups.

A computer readable storage medium storing a program of instructions executable by a machine to perform one or more methods described herein also may be provided.

Further features as well as the structure and operation of various embodiments are described in detail below with reference to the accompanying drawings. In the drawings, like reference numbers indicate identical or functionally similar elements.

BRIEF DESCRIPTION OF THE SEVERAL VIEWS OF THE DRAWINGS

FIG. 6 illustrates example servers shown with their dependencies in one embodiment of the present disclosure.

FIG. 10 shows an example from the XML representation of the difference between two system descriptions in one embodiment of the present disclosure.

FIG. 12 shows an example signature representing the common elements in two example system descriptions in one embodiment of the present disclosure.

DETAILED DESCRIPTION

Figure 1:
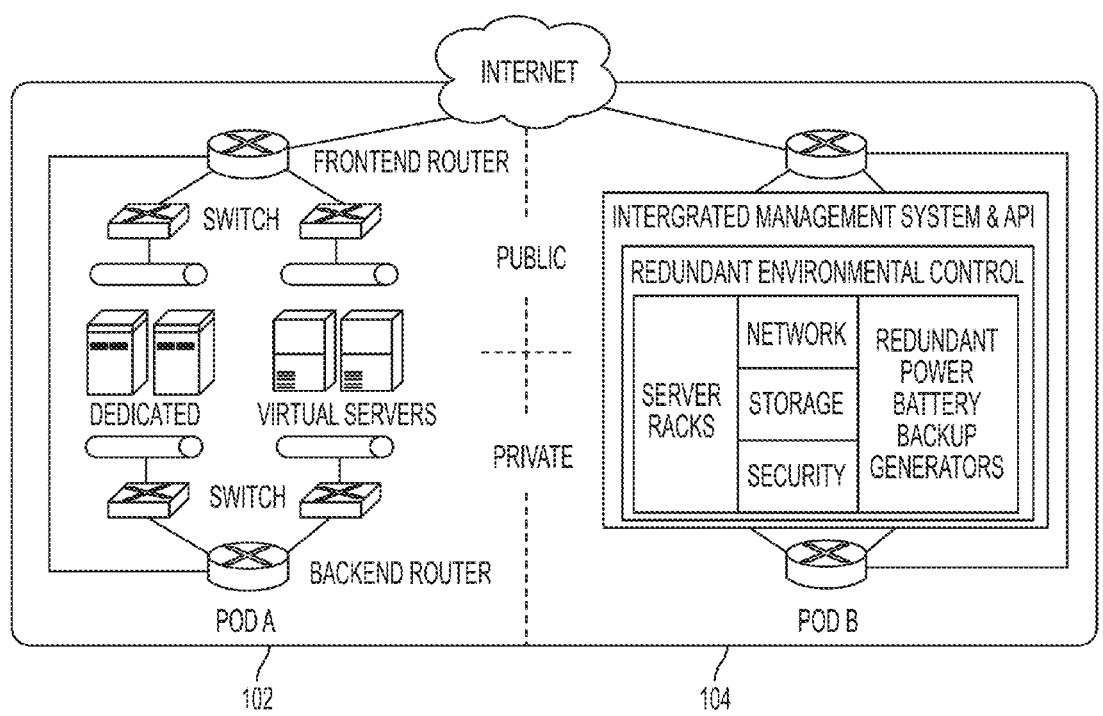
FIG. 1 illustrates an example of a simplified Pod design in data centers that may be utilized in one embodiment of the present disclosure.

In one embodiment, a method may be provided for automatically finding optimized target resources and configurations for enterprise data center migration, for example, to the Cloud. The method in one embodiment may be tailored for the Cloud architecture, and consider server behavior, resulting in optimized performance and cost. The method in one embodiment may examine relationships between servers in the source environment, identify potential resource consolidations and misconfigurations, and use this information to skillfully design a placement strategy, for example, for the target Cloud architecture, while also prioritizing security requirements and performance. One set of results on real data drawn from existing enterprise data centers demonstrate that the approach of the present disclosure is capable of reducing Cloud operational costs, e.g., by up to 60.1%, and also capable of finding types of misconfigurations from real enterprise datasets, e.g., affecting up to 81.8% of data center's servers. In another aspect, the method may expand migration planning scheme to include detection and design of target security policies and firewall rules.

Given the heterogeneous and dynamic nature of enterprise IT environments, a rapid and accurate discovery of complex infrastructure dependencies at the application, middleware, and network level would provide a successful migration to the Cloud. In the present disclosure, in one aspect, a method may automatically compute optimized target resources and identify configurations given discovered source properties and dependencies of machines, while prioritizing performance in the target environment.

In the present disclosure in one embodiment, a process or method is introduced for automating resource and configuration optimization for the target Cloud environment. The process considers details about discovered, existing site source data, including servers, their connections, communication patterns, running applications, etc. The process may include a method for identifying network dependencies amongst VMs, to group them and reduce communication overhead in the target; a method for grouping virtual machines (VMs) based on the resources and configurations; an approach for placing VMs on bare metal target servers to reduce network overhead and reduce operational costs; a method of generating one or more target configurations based on time, cost, and security considerations, as part of the migration process planning.

Planning ahead before migration may maximize resource utilization and optimize configuration in the Cloud. Such planning may use the knowledge of data center architectures to adjust machines in the local data center. This way, customers can prevent over-provisioning servers and avoid misconfigurations. While Cloud providers allow for provisioning computing resources in any data center, customers may still want a more controlled environment, particularly for the network configurations. Modern data centers may follow standardized best-practices based facility design, called Pod. Data center facilities feature one or more Pods, each built to the same specifications with best-in-class methodologies to support up to a number (e.g., 5,000) of servers. Leveraging this standardization across all geographic locations, data centers optimize key data center performance variables, including space, power, network, personnel, and internal infrastructure.

FIG. 1 illustrates an example of a simplified Pod design in data centers. It should be noted, however, that the methodologies of the present disclosure are not limited to applications in such data centers, as the figures is shown for illustrative purposes only. Each Pod (102, 104) has two routers (frontend router and backend router) to divide network space into public network (e.g., public internet protocols (IPs) with virtual local area network (VLAN)) and private network (e.g., 10.x.x.x IPs with VLAN), and each server has two interfaces to connect them. VLANs are managed in each Pod, so that each Pod can have 4,096 VLANs. A unit of Pod (104) contains an integrated management system and application programming interface (API) server that manages the server racks with redundant environmental control.

Generally, computing resources are directly related to the total cost, and therefore, optimizing the size of provisioned resources may reduce cost. For example, if a firewall network appliance (one of the most expensive resources) is provisioned, it will be directly connected to the frontend router and monitor all in/out traffic within its Pod only. Therefore, the network should be carefully designed in order to prevent multiple firewall network appliances from dominating the total cost. Additionally, the capacity of Pod is limited up to a number (e.g., 5,000) of servers, thus provisioning can fail due to the resource pressure. This is another reason that cohesive resource deployment plans are useful.

A misconfiguration in on-premise data centers may not pose a big problem since the whole data center is restricted by its own firewall, but in the Cloud environment one vulnerable virtual machine (VM) can propagate the vulnerability to other machines because machines often have both public and private interfaces by default. Also, customers often run both production servers and development and/or operational servers in the same data center, and development and/or operational servers tend to open ports for convenience, without a strict central policy. This could lead to serious security problems because development and/or operational servers usually have access to the production servers.

Replicating a data center's resources and configurations during migration to the Cloud might not necessarily result in the best setup for cost savings and high performance. In one aspect, an approach presented in the present disclosure may find target resources and configurations that reduce cost and offer high performance. The approach may include discovering network dependencies among servers, consolidating servers, identifying misconfigurations, and placing VMs on target servers.

The following description illustrates in one embodiment an approach to identifying the relationships and properties of site source data. The description also illustrates how to identify server misconfiguration and potential server consolidation in one embodiment. The description further provides suggestions for optimized resource provisioning for the target environment in one embodiment.

Source Dataset

Source dataset for designing migration planning, in one embodiment of a methodology of the present disclosure, may include knowledge of data center architectures, for example, real datasets from the data centers. Table 1 shows examples of the specifications of examples data centers, for instance, that can be used in the analysis in the methodology of the present disclosure. The three example data centers shown in Table 1 range in business function and size, and include a variety of operating systems.

TABLE 1

Specifications of data centers used for analysis

| Name | # Servers | Operating Systems |
|------|-----------|-------------------|
| DC 1 | 33 | Windows |
| DC 2 | 175 | Windows, Linux, Solaris, AIX, HP-UX |
| DC 3 | 1994 | Windows, Linux, Solaris, AIX |

In one embodiment, the datasets may be composed of raw data taken from output of various command line tools and structured data from Analytics for Logical Dependency Mapping (ALDM). ALDM is an infrastructure discovery service from International Business Machines (IBM) Corporation, Armonk N.Y. For instance, using such or another service or tool, data may be collected at intervals of time over a time period (e.g., at 15 minute intervals over a one week period). For example, the structured ALDM set may include a list of middleware dependencies between servers, server central processing unit (CPU), memory, and input/output (I/O) utilization over the collection period, and traffic activity over interfaces. Other examples of source dataset that may be used in the analysis of a methodology of the present disclosure may include raw data, e.g., from netstat, ifconfig, and uname output, as well as hardware information such as number of processors, memory capacity, and disk space.

In one embodiment, a methodology of the present disclosure may group the available data into categories to assist with the analysis, e.g.: static and dynamic. Static data provides information about the source server setting, such as CPU capacity, IP addresses, and operating system. In addition, a methodology of the present disclosure in one embodiment may evaluate dynamic data, e.g., to gauge the behavior of a particular server. Dynamic data category may include data such as a list of open ports, running applications, traffic flows, and CPU utilization over time, for example.

Target Resource Selection

A reason companies move their data centers to the Cloud are for cost savings and improved performance. When planning migration strategies, therefore, it is ideal to optimize the number of servers and their placement in the target environment to achieve these needs. Cloud services are typically billed in various categories, such as servers, storage, and security, at hourly or monthly rates. With an efficient migration planning strategy, companies should be paying the least amount to run their operations with high performance and security. The following description gives an overview of the steps involved in choosing a cost effective and secure migration plan in one embodiment.

Choosing Virtual or Bare Metal Server

Cloud providers may offer their customers the option of selecting a Cloud Computing Instance (CCI) or bare metal server, each offering different levels of cost, security, and compatibility. CCI servers have the option of being public (multi-tenancy) or private (single-tenancy) with different prices and security guarantees, whereas bare metal servers run in a private setting only, typically providing more platform, hardware, and hypervisor options, and maximum security for an increased cost. Without considering security, depending on how resources are deployed, either one can be beneficial. Thus customers should choose the target environment between CCI and bare metal server with care. For instance, if four servers, each requiring 2 cores, 4 GB RAM, and 100 GB SAN, need to migrate, one can either buy one bare metal server with Dual Processor Quad Core Xeon 5520, 2.26 GHz, 18 GB RAM, 500 GB SAN [total cost $315 per month] or virtual servers, each with 2 cores and 4 GB RAM, 100 GB SAN [total cost $90.69×4=$362:76]. Therefore choosing the right platform is useful.

VM Placement on Bare Metal Server

For servers that are migrating to a VM to be placed on a bare metal server, a VM to physical host placement strategy should be designed to minimize the amount of resources and overhead used in the target to effectively minimize operational costs while maximizing performance. Individual servers are often components of a service made up of servers running applications for a larger software function. As a result, these servers have strong dependencies on each other, and their target VMs should be placed near each other in the Cloud to minimize communication latency and achieve better performance. Knowledge of these dependencies helps to skillfully design a migration plan. An approach in one embodiment of the present disclosure is to first understand the network dependencies existing between servers in the source site in order to minimize the network overhead between servers requiring a high degree of communication. Network dependencies can be ascertained from examining the behavior of servers over time and can be ranked based on the number of active sockets between machines, the duration of the sockets' sessions, middleware dependencies, and the amount of traffic exchanged between the two endpoints.

In one aspect, a methodology of the present disclosure may study the problem of placement in the Cloud from a network point of view. In another aspect, a methodology of the present disclosure may address moving a set of servers as a unit onto VMs. For example, one embodiment of a methodology of the present disclosure may keep the current application-to-server setup intact and also may migrate the server as a unit to the Cloud.

It is noted that although migrating applications individually allows opportunities to update software and operating systems, it can be difficult or infeasible to rebuild some applications due to legacy or customer developed applications. Rebuilding servers may be also a time consuming process that even for a small data center could take several months.

As described above, a methodology of the present disclosure may examine network status output (e.g., netstat) collected periodically, e.g., every 15 minutes for one week from each server in an enterprise data center. Table 2 shows example fields of information that a methodology of the present disclosure in one embodiment may use in analyzing network dependency. For each pair of machines, a methodology of the present disclosure in one embodiment may record whether or not there exists a dependency, e.g., as indicated by an active socket or middleware dependency between the machines, and score the strength of the dependency. To rank the strength of each dependency, a methodology of the present disclosure in one embodiment may take various factors into consideration. For example, an active socket that is open for long periods of time likely indicates a higher dependence than one that closes immediately. The number of active sockets between machines and the traffic exchanged may be also factored in the scoring.

TABLE 2

Data used for discovering network dependencies between servers

| Data Source | Fields | Example |
| --- | --- | --- |
| netstat -nae | Protocol, Recv-Q, Send-Q, Local Address, Foreign Address, State | tcp4, 0, 0, 10.234.101.12.1500, 10.234.101.31.65272, ESTABLISHED |
| netstat -i | Name, Mtu, Network Address, Ipkts, Ierrs, Opkts, Oerrs, Coll | en3, 1500, 10.234.101, 10.234.101.12, 1961930589, 0, 4095676089, 3, 0 |
| netstat -nb | Protocol, Local Address, Foreign Address, State, Application | TCP, 10.10.15.10:1433, 10.10.15.15:49178, ESTABLISHED, sqlservr.exe |
| ALDM Middleware Dependency Output | Direction, This Hostname, Other Hostname | out, devsql1, devmht3 |

Figure 2:
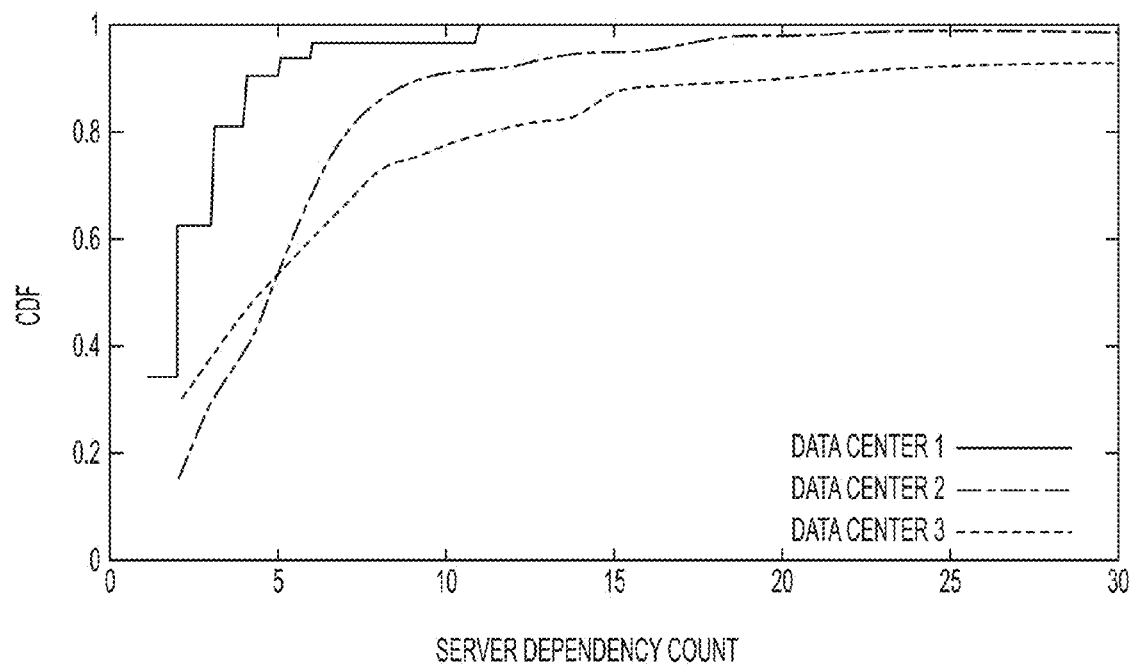
FIG. 2 shows CDF of network dependencies in three example data centers.
Figure 3:
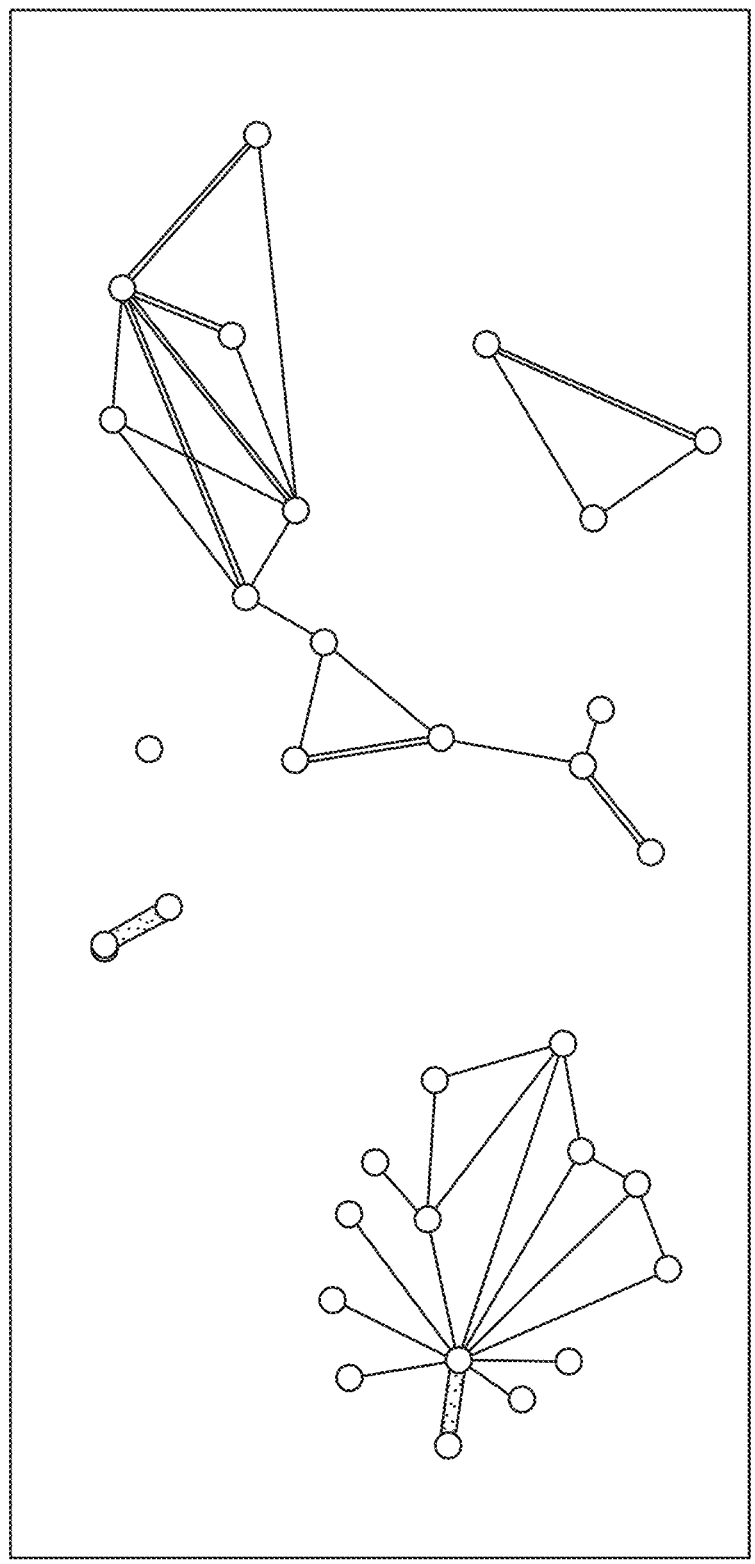
FIG. 3 illustrates a dependency graph between servers, weighted by strength in one embodiment of the present disclosure.

In one embodiment, a methodology of the present disclosure may represent the dependency using a dependency graph. FIG. 3 illustrates a dependency graph between servers, weighted by strength. FIG. 3 shows an example of a data center's resulting graph where each node represents a server and each edge is weighted by the strength of the dependency between the two endpoints (e.g., shown by the thickness of the edges in the figure). The expected density of data center graphs may be determined by performing a cumulative distribution function (CDF) of network dependencies for each server in the data centers, e.g., as shown in FIG. 2. FIG. 2 shows CDF of network dependencies in three example data centers. In the example data, 50% of the servers from each of the data centers have 5 dependencies or less, while 90% have approximately 10-20 dependencies or less, even though the size of the data centers varies widely. This finding demonstrates that the graph of network dependency is sparse and is made up of small clusters of servers that are highly intradependent.

A methodology in one embodiment of the present disclosure may migrate each server to a VM and then place VMs that have a high dependency nearby to each other in the target environment in order to minimize network latency for frequent communication. In an ideal setup, all dependent VMs would be located in the same server rack. However, realistically there are constraints on the number of servers in a rack and the number of racks that can fit behind the same router in the Cloud. Additionally, each of those servers has a limited capacity. In one aspect, a methodology of the present disclosure may adjust a dependency graph accordingly to reflect the resource requirements of each VM as a node weight; e.g., CPU, memory, and disk requirements. Other resource requirements may be considered. To estimate latency between VMs in the Cloud, it may be assumed that servers located in the same rack have a cost of 0 hops, servers located in adjacent racks have a cost of 1 hop, and so forth.

Figure 4:
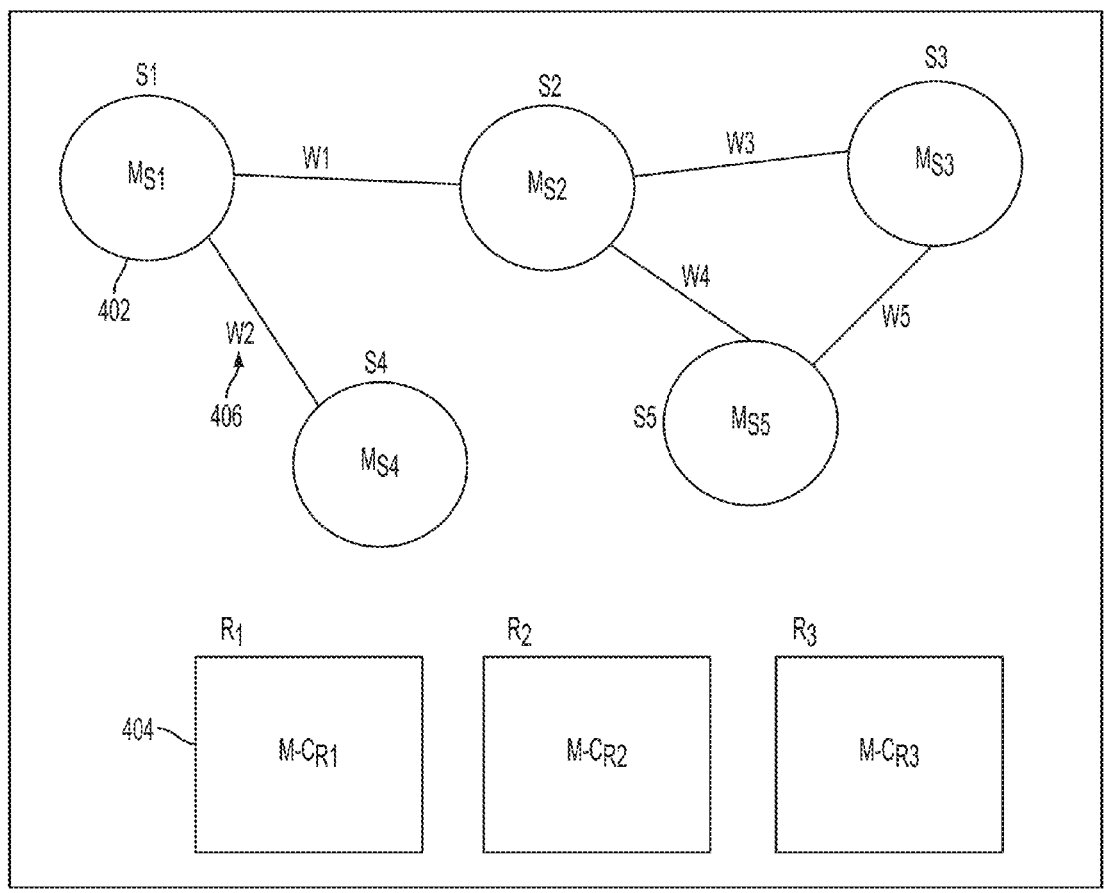
FIG. 4 shows a simplified version of a modified graph, with node weights, and target architecture in one embodiment of the present disclosure.

FIG. 4 shows a simplified version of a modified graph, with node weights, and target architecture. The graph problem is reduced to finding clusters of nodes with the highest dependencies (edge weights (e.g., 406)) such that the sum of the nodes' requirements fall within the capacity constraints of the target bare metal server. Vectors $m_i$ represents resource requirements, for example CPU utilization, memory, and disk space, needed for server $S_i$ (e.g., 402). Similarly, vectors m-$c_{Ri}$ contain capacities for target server $R_i$ (e.g., 404). In FIG. 4, a dependency graph is illustrated with nodes $S_i$ weighted by vector $m_{Si}$ of required resources needed for VM i, and edge weights $w_i$ indicating strength of network dependency. $R_i$ are target servers, for example, target bare metal servers with vector m-$c_{Ri}$ of resource capacities for server $R_i$. A methodology of the present disclosure in one embodiment may choose to dynamically provision servers, server racks, VLANs, and then Pods that are as close to each other as possible in order to reduce latency between servers incident on edges broken by the clustering. Additionally, a methodology of the present disclosure in one embodiment may choose appropriate target servers for clusters so that the total cost is minimized.

Since both parts of the problem—partitioning the VMs by maximum edge weight and bin-packing the clusters into the variable-sized servers—are NP-complete, it may not be feasible to find an optimal solution for large data centers. Based on the properties of a graph exhibiting a community structure, a methodology of the present disclosure in one embodiment may use a community identification algorithm to obtain strong results for the partition part of the problem.

Further, a methodology of the present disclosure in one embodiment may use the cluster dependency scoring as a heuristic for the bin-packing step. As an example, the Louvain method may be implemented for community detection, a greedy optimization method may be implemented that partitions a graph in near-linear time based on the strength of the connection between nodes, also known as modularity. The modularity Q of a community $c_i$ of a graph can be more formally defined as $$Q = \frac{1}{2m} \sum_{i,j} \left[ A_{ij} - \frac{k_i k_j}{2m} \right] \delta(c_i, c_j) \quad (1)$$

where $A_{ij}$ is the edge weight between vertex i and node j, $k_i$ is the sum of the edge weights attached to vertex i, and $$m = \frac{1}{2} \sum_j A_{ij}.$$

The δ d function is 1 if u=v, otherwise 0.

Once a methodology of the present disclosure in one embodiment has the graph broken into clusters of dependent VMs, a methodology of the present disclosure in one embodiment may search for a target server capable of fitting the cluster with the minimum cost. If there is space to fit a cluster onto a non-empty server, a methodology of the present disclosure in one embodiment may choose to place on the server containing clusters with the highest dependencies to the cluster a methodology of the present disclosure in one embodiment seeks to place. If there is no space in any existing server or a methodology of the present disclosure in one embodiment has reached a packing threshold (for performance reasons), a methodology of the present disclosure in one embodiment may choose a new one with minimum cost. This approach to placement ensures that highly dependent servers are placed in close proximity in order to reduce network overhead.

Server Consolidation

One of the benefits of cloud computing is to reduce operational costs by paying only for the resources that are used. If servers in the source environment are migrated as-is, requesting the same memory and CPU capacity, this may result in a very large unnecessary expenditure. For example, if a source server contains 64 GB of memory, but uses only 4 GB of it, there is no need to request the full 64 GB in the target environment. Doing so would result in underutilized servers in the target that consume extra energy and space. In addition, it may be possible to consolidate servers into one target VM in order to reduce the overhead and cost of deploying multiple individual ones.

However, not all servers are good candidates for consolidation. Two servers offering services on the same port, for example, would not be able to move to the same VM and use the same interface. Similarly, if the machines are running two different operating systems or heavily rely on the same applications, they should not be consolidated. Care should be taken to ensure that resource-intensive servers are placed on separate target servers in order to prevent a degradation of service due to an overloaded server. VM consolidation may consider energy efficiency and number of physical servers, for instance, consolidate VMs on the minimal number of physical servers. Used in the migration space, an approach or the present disclosure may have the potential to reduce operational expenses as well by reducing the number of source physical servers that need to be mapped to target hosts.

Misconfiguration Identification

Configurations errors and application weaknesses can cause a multitude of problems for data centers, yet they are common. Since the Cloud differs from a local data center in that it can be shared by multiple tenants, the effects and weaknesses imposed by misconfigurations may pose more security vulnerabilities in this type of environment. Identification of where these errors occur should therefore be performed prior to migration. From a network point of view, a methodology of the present disclosure in one embodiment may identify application weaknesses and/or misconfigurations by looking at socket behavior. A methodology of the present disclosure in one embodiment may also use system and application logs to provide clues on where misconfigurations exist.

TCP sockets keep track of their connection state, which fluctuates as connections are opened, closed, and timed out. A large number of sockets remaining open unnecessarily can consume memory and take up port space, potentially making a server vulnerable to denial of service (DoS). Sockets that remain in an unchanged state, other than established, idle, and listening, could be indicative of erroneous behavior, including an application weakness, an unresponsive host, routing misconfiguration, or SYN flood.

Dropped packets and incorrect checksums can also indicate misconfigurations and/or a poorly configured network. If a server is so overloaded that it starts to experience packet collisions, it may be wise to implement a load balancing system or improve the network topology to alleviate the congestion.

System and application logs can assist in finding misconfigurations as well. For example, application logs may record when applications fail to launch properly or when they are missing files. System logs can contain information about errors related to the system, such as a driver failing to load or a component not being able to acquire the current time. Further analysis should be done prior to migration to determine which application or system components are causing the errors in order to improve robustness and reliability in the new environment.

The following description illustrates a use case example using a methodology of the present disclosure in one embodiment.

Experiments

As described above, migration planning using the above-described methodology may provide cost savings. The experiments described herein were performed on three enterprise data center datasets and were composed of four stages. Initially, a methodology may include identifying misconfigurations in the source environment are identified. In the second step, a methodology may include attempting to reduce the number of servers in the source site prior to migration. A methodology may then compare migration to bare metal servers versus CCI public and private clouds for different levels of cost and security. Finally, when migrating to bare metal servers, a methodology may perform the clustering and placement approach described herein with a server packing threshold of 80%. It is demonstrated that the migration planning strategy of the present disclosure is capable of greatly reducing target Cloud service costs compared with migrating data centers as is, without considering a server's utilization, dependencies, or behavior.

Cost Model

To determine accurate target Cloud service costs for migration plans, a cost model is populated with real data taken from a known website for CCI and bare metal server options. For CCI servers prices for both public and private clouds are considered. The capacity of servers is determined according to four of the most common computing constraints: the processor speed, number of CPU cores, memory size, and disk size. For simplification, the lowest cost for disk space is selected, regardless of how storage is split among individual disks. The model also includes necessary licensing fees for closed-source operating systems, assuming that source servers would remain on the same operating system in the target environment.

Misconfigurations

As discussed above, server misconfigurations pose an increased security threat in a shared infrastructure such as the Cloud. Four types of misconfigurations are identified during the experiments. They are summarized in Table 4. A methodology of the present disclosure located TCP sockets that remained in an unchanged state, other than established, idle, and listening, for more than two collection periods (30 minutes). After deeper investigation, it is noticed that most of the stagnant sockets remained in the close_wait or time_wait states, indicating application weakness or accumulation of reserved sockets due to many connections opening and closing quickly. Regardless of the cause, such behavior can affect performance as activity is scaled up and should be eliminated prior to migration. It is clear from the results that an unusually high number of servers belonging to DC 2 have application-related errors, especially considering the small size of the data center. We were able to conclude that a large number of these errors stemmed from a certificate access problem due to a misconfiguration in the network authentication protocol (Kerberos). Across all three of the data centers, the highest total percentage of servers affected by at least one misconfiguration is in DC 1, at 81.8%.

TABLE 4

Percentage of data center servers with identified misconfigurations

| Type | Type | Type | Type |
|---|---|---|---|
| Packet errors | (no data) | 24% | 10.7% |
| Application log errors | 78.8% | 15.8% | 22.3% |
| System log errors | 42.4% | 12% | 30.8% |
| Stagnant sockets | 9.1% | 32.7% | 20.1% |

Resources

Server Consolidation

In the use case experiment, candidate servers are selected for consolidation based on four criteria: operating system, running applications, open ports, and load/utilization factor. 6 servers are found for potential consolidation in DC 1, 2 in DC 2, and 0 in DC 3. Note that for this experiment consolidating a maximum of two servers are considered; therefore, the 6 combinable servers were reduced to 3, and the 2 consolable to 1. The more diverse a data center is with respect to its servers' applications and middleware, while at the same time having many overlapping operating system types, the more consolidation is possible. Therefore, the cost reduction generated from consolidated servers may vary among data centers.

CCI Vs. Bare Metal

The experiment includes applying the migration planning approach of the present disclosure on three different scenarios: migrating to bare metal servers, CCI public cloud, and CCI private cloud. Bare metal and CCI private cloud may be selected for high security data centers and to fulfill compliance requirements, while CCI public clouds may be more for general-purpose and non-sensitive computation. There is a large difference in price for each of the three options, with the highest security resulting in the greatest cost. Final selection for a target environment, therefore, becomes a difficult tradeoff between security and cost, and may be left to the discretion of the user.

However, for data centers that contain highly dependent and not overly-resource-intensive components, a migration plan can largely reduce the cost of bare metal deployments by clustering these dependent components and reducing the number of target servers needed. Note that the experiment does not perform the clustering step for CCI deployments, since control is not available over the exact placement location of those VMs in the Cloud.

One example is DC 2 in Table 3, where the migration approach of the present disclosure in one embodiment reduces bare metal monthly costs by 60.1% as it reduces the numbers of necessary individual servers by 73% compared to migrating the data center as-is. Excellent results are seen from clustering in the two other data centers as well. DC 1's physical server count is reduced by 67.7%, resulting in a 47% costs savings, and a 49% reduction in DC 3's number of servers, for a savings of 19.8%

VM Placement on Bare Metal Servers

VM clustering and placement technique of the present disclosure in one embodiment also prioritizes performance in addition to lowering costs by placing highly dependent components on the same target bare metal server, reducing network overhead. It is interesting to note in the experiment results that server consolidation for bare metal migration actually caused a small increase in price for DC 1 and DC 2 over the same migration approach without consolidation. This is due to the sizes of the consolidated servers: since the experiment performs the consolidation step before clustering, if two servers that are consolidated together utilize a high percentage of the target bare metal server's resources, there will be less room to place other VMs that are part of the consolidated server's dependent cluster. Therefore, if servers selected for consolidation do not have a high intradependency, consolidating them may actually yield worse results for both cost and performance. However, both options should be considered in the migration planning, since the results are dependent on the setup of a particular data center.

TABLE 3

Experiment results showing monthly costs with and without migration planning for three Cloud server types

|  | DC 1 | DC 2 | DC 3 |
|---|---|---|---|
| Bare metal-no planning | $13966 (33 servers) | $48177 (175 servers) | $531685 (1994 servers) |
| CCI public-no planning | $6993.46 (33 VMs) | $28825.66 (175 VMs) | $299781.46 (1994 VMs) |

TABLE 3-continued

Experiment results showing monthly costs with and without migration planning for three Cloud server types

| | DC 1 | DC 2 | DC 3 |
|---|---|---|---|
| CCI private-no planning | $10352.57 (33 VMs) | $48291.41 (175 VMs) | $536699.46 (1994 VMs) |
| Bare metal-consolidation | $7547 (10 servers) | $19234 (46 servers) | (no possible consolidation) |
| Bare metal-no consolidation | $7339 (10 servers) | $19222 (47 servers) | $426240 (1008 servers) |
| CCI public-consolidation | $4691.93 (30 VMs) | $22649.23 (174 VMs) | (NA) |
| CCI public-no consolidation | $4811.06 (33 VMs) | $33663.83 (175 VMs) | $200634.72 (1994 VMs) |
| CCI private-consolidation | $7828.91 (30 VMs) | $43223.29 (174 VMs) | (NA) |
| CCI private-no consolidation | $8342.94 (33 VMs) | $43377.89 (175 VMs) | $415530.72 (1994 VMs) |

The above use case experiment described an example scenario for applying a migration method of the present disclosure in one embodiment, e.g., an automated method of migrating workloads. It should be understood, however, that the methodologies of the present disclosure are not limited to the particular example described above.

In another aspect, the methodologies of the present disclosure may be used to identify specific highly-dependent clusters of machines that are good candidates for hybrid migration. The methodologies of the present disclosure may provide for an automated solution for discovering communication and network dependencies. In another aspect, the methodologies of the present disclosure in one embodiment may use a scoring system that ranks the strength of the network dependency between servers and identify communities of strongly connected components before placing, which may produce efficient results. In one aspect, servers or racks need not be packed to the maximum capacity. In another aspect, security requirements may be considered when selecting locations for the VMs. For instance, placing VMs with sensitive information in isolation may be handled by placement approaches of the present disclosure in one embodiment.

As described above, a methodology in one embodiment of the present disclosure may recommend server consolidation and resource groups, and automatically detect misconfiguration. In one aspect, the methodology may discover one or more properties and dependencies of virtual machines; identify machines that can be consolidated; detect misconfigurations to fix, e.g., before migration, e.g., to the Cloud; group machines based on the dependency strength; and iteratively regroup based on the resource availability.

In one aspect, the methodology may be implemented as an engine that provides the recommendations (e.g., best or optimal) for provisioning resources to reduce the total cost, and fixing misconfiguration to increase performance. The methodology may be implemented and used as part of migration to cloud service to recommend migration planning (e.g., consolidate machines that can fit into one machine without configuration and performance problem). The methodology may also be integrated with the cloud management service guiding the user through the set of resource provisioning plan.

As described above, a methodology of the present disclosure in one embodiment may include grouping servers by strength of network dependency (e.g., based on specific source socket information and middleware configuration) for placement in the target. The methodology of the present disclosure in one embodiment may also include a recommendation for server consolidation without performance and configuration conflicts. The methodology of the present disclosure in one embodiment may also include detecting misconfigurations that can be vulnerable in the Cloud. The methodology of the present disclosure in one embodiment may also include modularity based graph partitioning using community detection algorithm (e.g., fast-performing greedy optimization method).

The methodology of the present disclosure in one embodiment may be useful in automated resource planning for migration, increasing customer trust by recommending reduced cost, and improving performance in the target by lowering network overhead between dependent servers.

Figure 5:
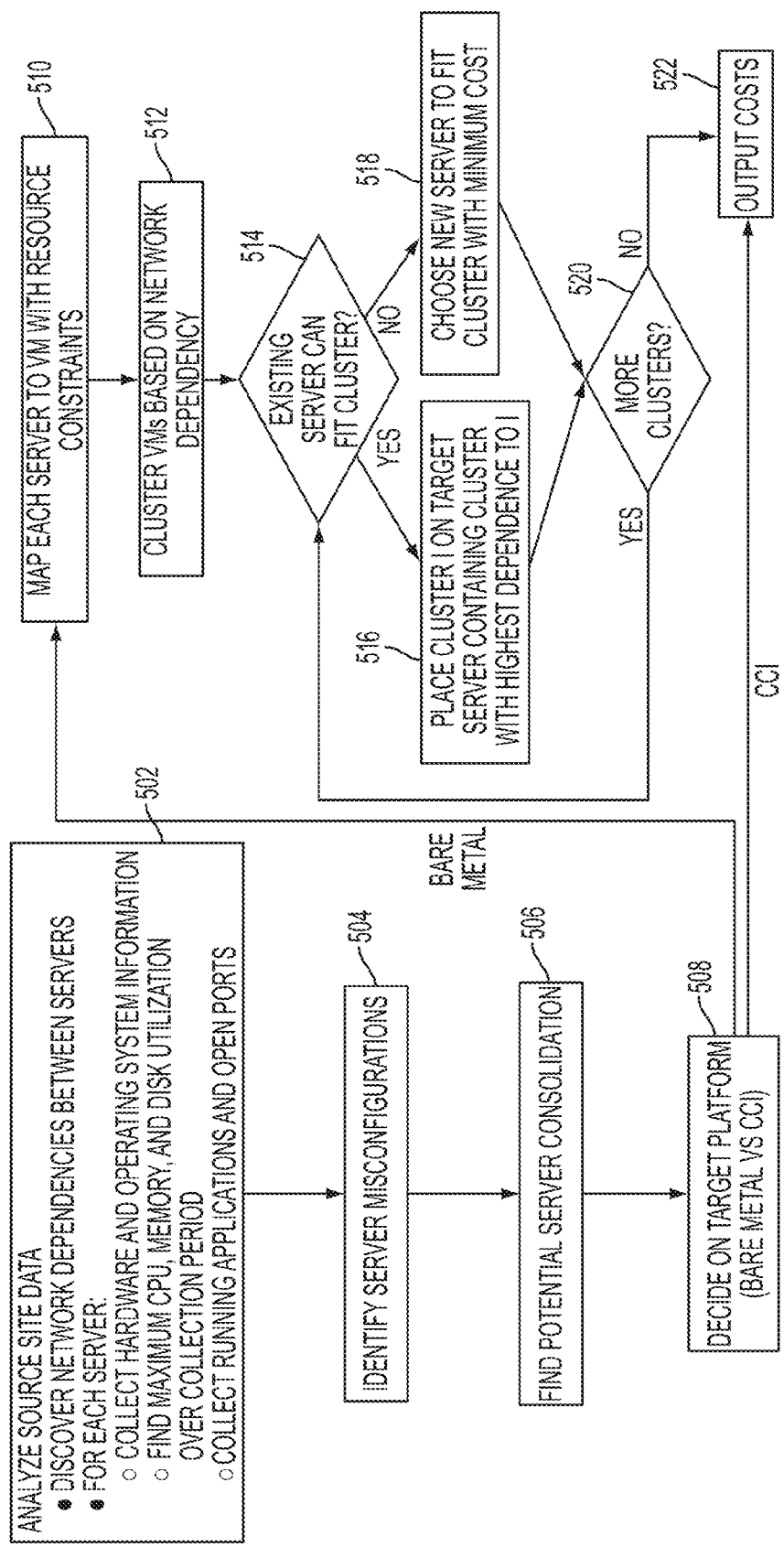
FIG. 5 is a flow diagram illustrating a process overview for resource provisioning planning for enterprise migration, for example, to the cloud environment, in one embodiment of the present disclosure.

FIG. 5 is a flow diagram illustrating a process overview for resource provisioning planning for enterprise migration, for example, to the cloud environment, in one embodiment of the present disclosure. Input parameters to the process in one embodiment may include one or more of command line tool output (e.g., netstat, ifconfig, uname), ALDM dependency data (e.g., middleware dependencies), utilization information (e.g., CPU, memory, I/O), hardware specifications (e.g., processor speed, disk size), application information (e.g., running processes, etc.), log output (e.g., system, application). Other input parameters may be considered. Input parameters may be generated, e.g., by running such one or more command line tools, discovery tool, parsing log data, and retrieving system, hardware, and/or application information. A source site, for example, may include information technology (IT) infrastructure of an enterprise. The information technology infrastructure (IT) may include at least a plurality of servers and a plurality of applications. The tools described above, may be run for example on the IT infrastructure to generate the input parameters, e.g., source site data.

At 502, source site data for example the input parameters, may be analyzed. The analysis discovers network dependencies between servers of the source site. For each server, hardware and operating system information may be collected; maximum CPU, memory, and disk utilization data may be extracted or monitored over a collection period; information on running applications and open ports may be collected.

At 504, one or more server misconfigurations may be identified. In one aspect, misconfigurations may be identified by analyzing sockets, e.g., transfer control protocol (TCP) sockets, dropped packets and incorrect checksums, and/or system and application logs.

At 506, potential server consolidation may be determined. For instance, the process in one embodiment may identify groups of source servers that are running the same operating system and version. For each of those groups, the process in one embodiment may find groups of servers that do not have overlapping open ports and running applications. For the resulting groups, the process in one embodiment may choose to consolidate the servers based on target cost and performance (load).

At 508, target platform determination may be made. For example, target platform may be determined to be a bare metal server and/or a cloud computing instance.

At 510, each server is mapped to a virtual machine with resource constraints. A plurality of servers may be mapped to a plurality virtual machines, respectively.

At 512, the virtual machines may be clustered based on network dependency, producing one or more clusters of virtual machines. Grouping or clustering may include identifying network dependence between servers by active socket or middleware dependency. Weight of the dependency may be scored based on: a level of socket activity, e.g., defined by number of TCP state changes over collection period; number of active sockets; duration of socket length; number of middleware dependencies, e.g., defined by active socket or configuration setting; prior clustering approaches examine only traffic volume. Any one or combination of those attributes may be used to score weight of the dependency (also referred to as edge weight). Using the edge weights, servers (or virtual machines to which servers are mapped) may be clustered based on modularity, or density of dependency using Louvain community detection. Modularity of community $c_i$ may be defined by Equation (1) above, where $A_{ij}$ is the edge weight between vertex i and node j, $k_i$ is the sum of the edge weights attached to vertex i, and $$m = \frac{1}{2} \sum_j A_{ij}.$$

The δ d function is 1 if u=v, otherwise 0. In another aspect, grouping of virtual machines may be based on discovering application instances and dependencies on the plurality of servers, based on a weighted similarity metric, which is described in more detail below, e.g., with reference to automated approach to application discovery.

The process may iterate as follows providing an iterative resource provisioning method. For each cluster of dependent nodes (referred to as a candidate cluster), at 514, it is determined whether an existing server (e.g., also referred to as a target server) can fit a candidate cluster.

At 516, if it is determined that the existing server can fit the candidate cluster, the candidate cluster is placed on the target server containing a cluster with highest dependence to the candidate cluster.

At 518, if it is determined that the existing server cannot fit the candidate cluster, a new target server is chosen to fit the candidate cluster with minimum cost. For example, if a new server is available in the same server rack as the existing servers, a new server with minimum cost may be chosen. Otherwise, a new server in the closest server rack may be chosen. If VLAN is full, the process of selecting may be repeated with the next closest VLAN. If Pod is full, the process of selecting may be repeated with the next closest Pod.

At 520, if there are more candidate clusters, the process continues to 514 to iterate the processing at 516 and 518 with the next candidate cluster.

At 522, costs for the planned provisioning may be computed and provided.

In one aspect, at 508, if a target platform is decided to be a CCI, the processing at 510, 512, 514, 516, 518 and 520 may be omitted.

FIG. 6 illustrates example servers shown with their dependencies in one embodiment of the present disclosure. The nodes 602 represent servers and the edges 604 are shown with edge weights 606. The servers may be clustered into two clusters 608, 610, according to a process described above.

Figure 7:
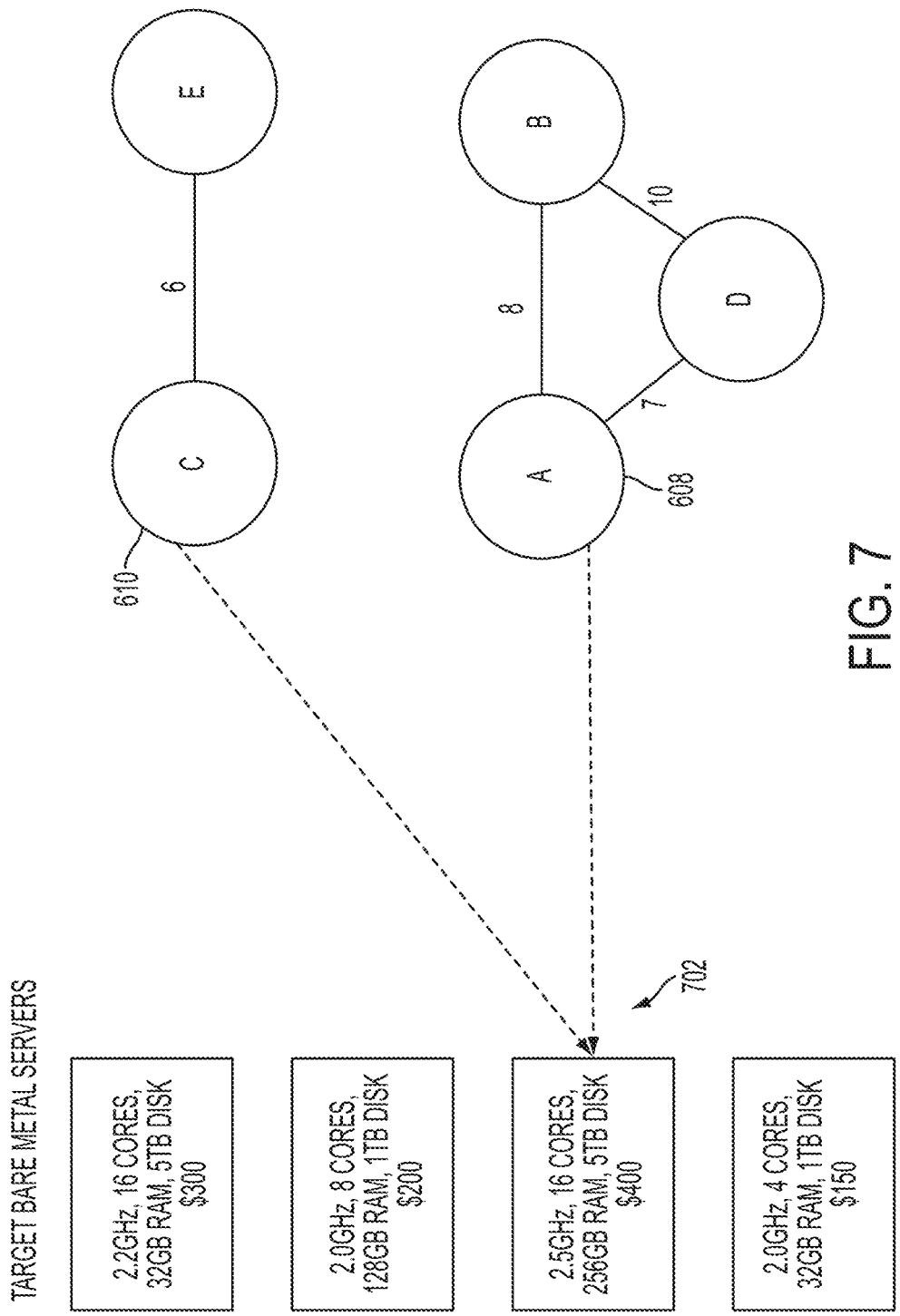
FIG. 7 illustrates the example clusters of FIG. 6 placed in a target server in one embodiment of the present disclosure.

FIG. 7 illustrates the example clusters of FIG. 6 placed in a target server in one embodiment of the present disclosure. For instance, clusters 608, 610 are placed in target server 702, based on resource constraints of the target server and resource requirements of the clusters, according to a process described above.

In another aspect, a methodology may be provided that determine groups of servers that are likely to be working together to deliver any single business application. Such technique may prevent some business application sets from being split across multiple waves without otherwise interfering with a migration wave planning process.

When planning a data center migration it is useful to discover the client business applications and on which devices (server, storage and appliances) those applications are deployed in the infrastructure. It is also useful to understand the dependencies the applications have on the infrastructure, on other applications and in some cases systems external to the client.

However clients may not be able to provide that information in a complete and accurate manner. The usual approach then has been to obtain the information by asking the client's application and platform owners a series of questions but in most cases clients do not have the tools or skills to acquire the requested information. The lack of accurate information leads to project delays, increased cost and higher levels of risk. In the present disclosure, an algorithm and tools may be presented for programmatically identifying and locating business application instances in an infrastructure, based on weighted similarity metric. Such automated approach to application discovery may significantly help clients to achieve their project objectives and timeline without imposing additional work on the application and platform owners.

Migrating on-premise computing resources into the Cloud may provide access to elastic computing resources. Migration to the Cloud may provide the advantage of capital and operational cost reduction. Also, Cloud architecture may provide support for variety of deployment architectures via public/private/hybrid infrastructure-as-a-service (IaaS) offerings to meet different security and resource demands. Despite the significant interests, migrating enterprise-scale workloads has been technically challenging. A deterrent preventing the rapid exodus to Cloud is the lack of holistic migration techniques and migration planning tools that can help minimizing business impact during migration.

Given a large number of servers running on different platforms, different system properties of source machines need to be considered to discover business application groups that can reflect realistic business impact, and in turn create well defined migration wave plans (minimizing business impact). For example, on-premise servers likely run on different (hardware and virtualized) platforms—different physical boxes including Intel, AMD, or PowerPC, and various hypervisors that involve different image formats. Not only platforms, operating systems where applications run on also have different architectures and versions. Further in upper level, multi-tier application groups have more diverse system properties including network communications and data sharing models. Therefore, using various system properties, seeking business application groups, each of which can be migrated together, is useful to minimize the business impact during migration to Cloud.

Figure 8:
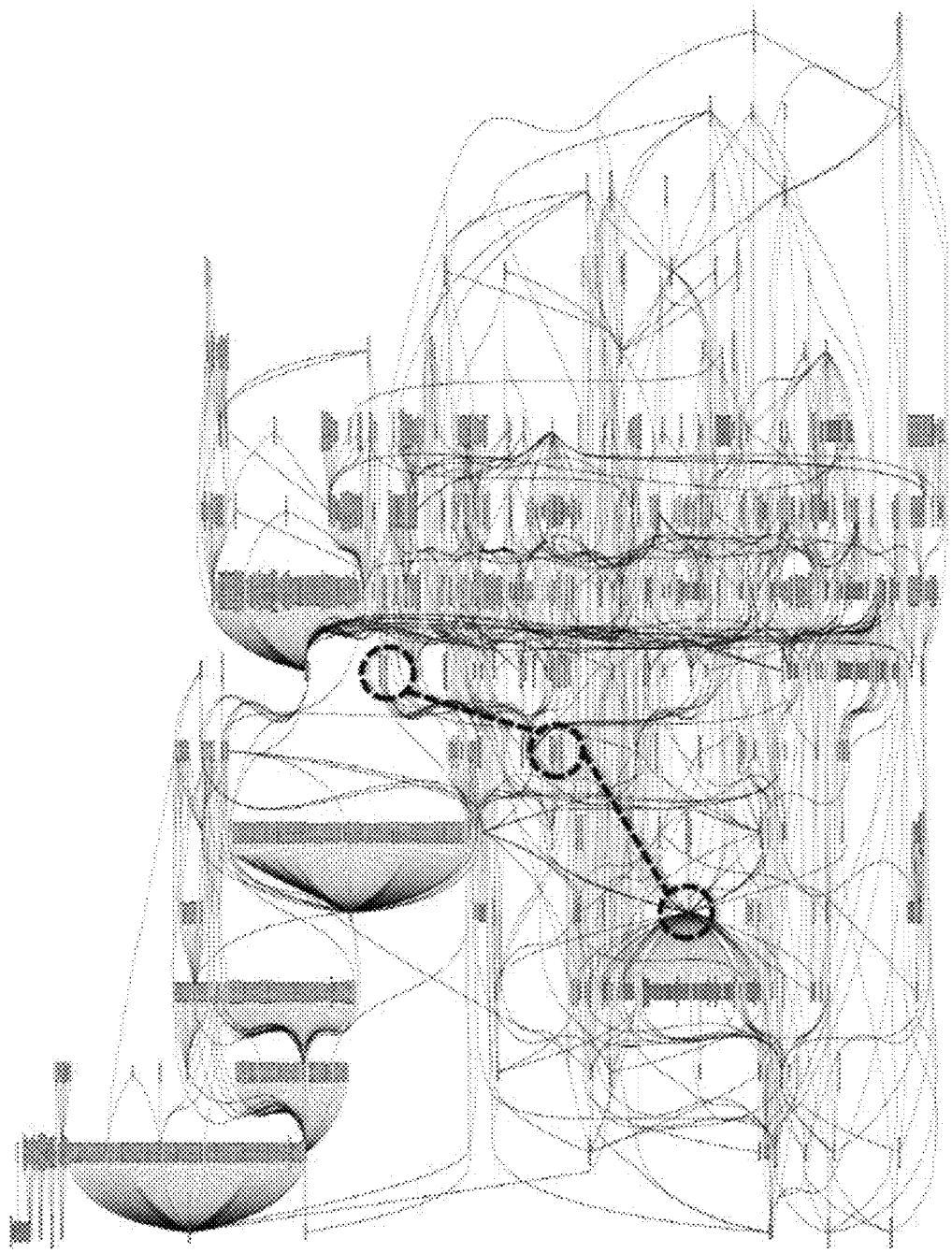
FIG. 8 shows a portion of the server-to-server dependency graph of an example medium scale data center.

Designing migration waves to allow for groups of servers that work together (business application groups) is a useful component of enterprise-scale migration. In general business application groups provide group selection centered around a business application workload which in turn allows one to project the impact on a migration event. A challenge is to discover computing resources from usually extremely complex environment (e.g., as shown in FIG. 8) to migrate, and group similar servers that should be migrated together with network and application affinity, and finally create wave plans based on the server groups. FIG. 8 shows a portion of the server-to-server dependency graph of a medium scale data center. Dashed circles and lines indicate an example of a three-tier server dependency architecture, from WebShpere® Application Server (WAS) → DB2 database server external → storage server. Grouping servers is useful because composing good groups of servers can achieve a minimum service disruption, in turn reducing migration costs, during/after migration waves.

With well defined server groups, each group has high intra dependency with similar platform/application types, and low inter dependency between the groups. A pattern matching technique may be leveraged to search for certain profiles amongst the servers from the collected source site data, and compose server groups. System properties (i.e., server configurations and network connections) may be used to represent the strength of the servers, helping grouping algorithms to find the best groups.

To advance the migration wave planning, for example, a methodology of the present disclosure in one embodiment may find the best practical business application groups, each of which has high functional similarity based on the system property discovery including network ports/sockets, traffic flows, applications, and resource usages over time, as well as the business application. Through domain experience, a methodology of the present disclosure in one embodiment may categorize the system properties of each server, and assign weights to particular sections of the system properties. Through this weighting process a methodology of the present disclosure in one embodiment may reduce the number of servers that are in a similarity group. Then using patterns of server communication and business application signatures, server groups may be proposed. To validate the correctness of server groups, the proposed server groups and correct server groups derived from interviews of practitioners and direct system evaluation by migration wave architects may be compared.

The following description illustrates methods on collecting system descriptions to gather necessary information for grouping, how the similarity between servers may be measured, and how to use that information to group servers.

Server grouping may be considered to be in the pattern matching domain, as a methodology of the present disclosure may be looking for certain profiles amongst the servers in the source site. Spectral clustering represents a set of techniques which rely on the eigen-structure of a similarity matrix to partition points into disjoint clusters with points in the same cluster having high similarity and points in different clusters having low similarity. Spectral clustering and path-based clustering are related clustering approaches in the domain of machine learning and pattern recognition. They have demonstrated great performance on some clustering tasks, which involve highly non-linear and elongated clusters, as well as compact clusters. A known technique includes a path-based algorithm for spectral cluster generation, defining a robust similarity measure that reduces the effects of noise and outliers in the data. Key challenges with spectral clustering are that one needs to (1) know how many clusters one is looking for, (2) be able to ignore the outliers that are in no group at all, and (3) tolerate multiplicity for elements that may be in more than one group.

Collecting System Descriptions

Figure 9:
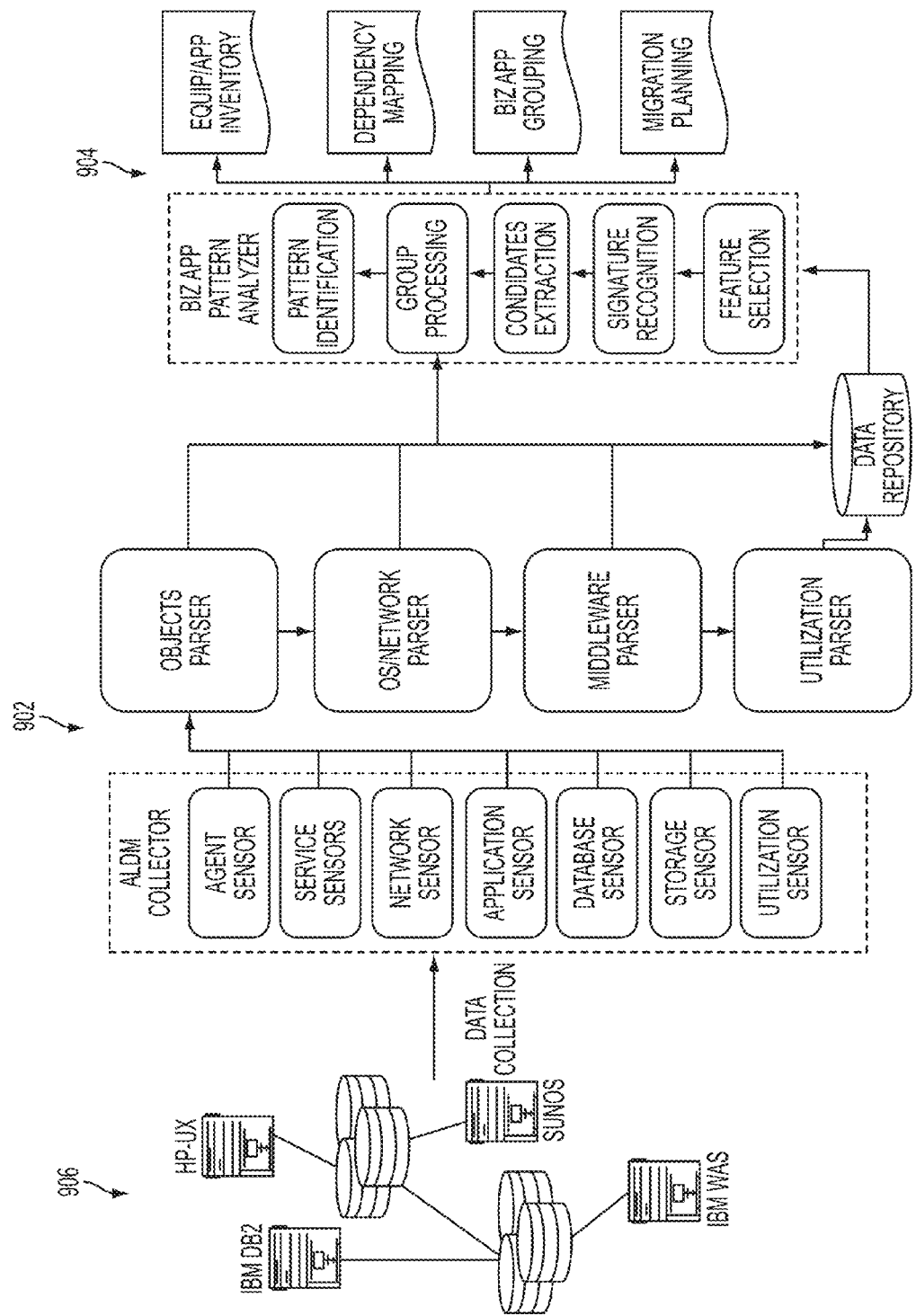
FIG. 9 shows an ALDM framework used in collecting system description data for automated application discovery in one embodiment of the present disclosure.

In one embodiment of the present disclosure, a methodology of automated business application discovery may build on Analytics for Logical Dependency Mapping (ALDM), an IBM infrastructure discovery framework. FIG. 9 shows an ALDM framework used in collecting system description data for automated application discovery in one embodiment of the present disclosure. An ALDM may include a front-end 902 and a back-end 904. The frond-end 902 is a light-weight discovery kit that runs in customer data centers 906. All of the data is collected at a programmable parameter (e.g., 15 minutes) interval over a period of time (e.g., two weeks). A set of information is collected including middleware configuration, server CPU, memory, and I/O utilization over collection period, network traffic activities, and running processes.

The back-end 904 is data processing engine of the present disclosure in one embodiment running, for example, in Cloud, which processes and analyzes the collected data. It provides two categories of data for further analysis: static and dynamic. Static data may provide basic information about server setting, such as CPU capacity, IP Addresses, Operating System, and other hardware related information. Dynamic data may include a list of open ports, traffic flow, running applications, CPU, memory, I/O usage trending over time, server to server and application to server dependencies.

Processing engine stores the intermediate results into a computer file, e.g., well structured XML file (e.g., named sysconfig.xml), including both static and dynamic information, for internal communication. Further analysis, such as Business Application mining and interactive visualization can be applied on top of it. In the end, an ALDM processing engine outputs an inventory report, business application signatures, graphic representations of dependencies, and other information migration engineers can leverage to create affinity groups, or migration plans.

Measuring Similarity

Based on the data collected over a period of time, e.g., in sysconfig.xml, the similarity between two systems may be determined. For instance, ALDM includes a tool for comparing two XML system descriptions. The tool is normally used to compare two images of the same system. A methodology in one embodiment of the present disclosure may use comparisons between the descriptions of different systems to deduce functional similarity. A methodology in one embodiment of the present disclosure may use this measure of similarity to propose groups of servers that may comprise business application groups. Algorithms for proposing groups are disclosed below. In one aspect, similarity may be expressed as scalar "distance metrics" between pairs of systems.

Comparing System Descriptions

The following description explains a methodology used in comparing system descriptions in one embodiment. The comparison detects insertions, deletions, and changes. In one embodiment of a methodology of the present disclosure, elements are considered equal if they have the same qualified name (e.g., XML tag), and the same attribute values. Changes to particular attributes that are assigned arbitrary values during scanning may be ignored. Insertions and deletions correspond to elements in either of the system descriptions for which no equal element exists in the other. Changes are elements that are equal, but contain insertions or deletions among their child elements. An example is shown in FIG. 10. FIG. 10 shows an example from the XML representation of the difference between two system descriptions. The element tags for matching but changed sections are indicated by reference item 1002.

Any text in the server description that matches (ignoring case) the server's own name may be converted to a marker that is considered to match similar markers from other descriptions. Although a self-reference may be using a locally provided service that is also used by other servers in the same group, it more commonly corresponds to self-references in the configurations of other group members. These are frequently found in URLs (e.g., a local service) or in file paths (common in WebSphere® Application Server installations).

One way to derive a scalar similarity metric from the difference between two system descriptions is to count the elements they have in common. If system A is described with 123 elements, System B with 58 elements, and 22 elements are common to both sets, then that's 44 of 181 elements in total, or 24% similar.

Unfortunately, not all lines of the system description are equally useful when determining similarity. For example, one section of the sysconfig.xml records the version of ALDM that was used to generate the scan. Another way of comparison might ignore this group of elements, and possibly give more value to the installed software packages and network connectivity than it gives to disk usage and network interface cards.

A methodology of the present disclosure in one embodiment may apply domain experience to assign weights to some sections of the system description, using these as multipliers for shared elements contained in these sections. The sub-tree evaluations may be measured as value pairs (number_in_common×(multiply by) weight, and total_lines×weight) to allow sub-trees of different weights and sizes to be combined reasonably, for example, as shown in Algorithm I. This allows a large number of similar values in a low-weight branch to be as important as a small number of values in a high-weight branch.

Algorithm I: Calculating the Weighted Similarity Value for an Element:

```
Given: float myWeight
Given: boolean myAttributesChanged
Given: List childComponents
int p= myAttributesChanged ? 0 : 1;
int t= 1;
for all (WeightedSimilarity c in childComponents) {
        int w= c.getWeight( );
        p += c.getMatchingElementCount( ) * w;
```

-continued

```
        t += c.getTotalElementCount( ) * w;
}
myMatchingElementCount= p;
myTotalElementCount= t;
```

Most elements have a weight of one, but other weights may be assigned to elements by name, e.g., based on expert opinions. The lowest weight used is zero, such as for elements that describe the scan scripts (version, run date, etc.) rather than the system itself, while weights as high as five are used for network connectivity sections. Other values for weights may be used.

Figure 11:
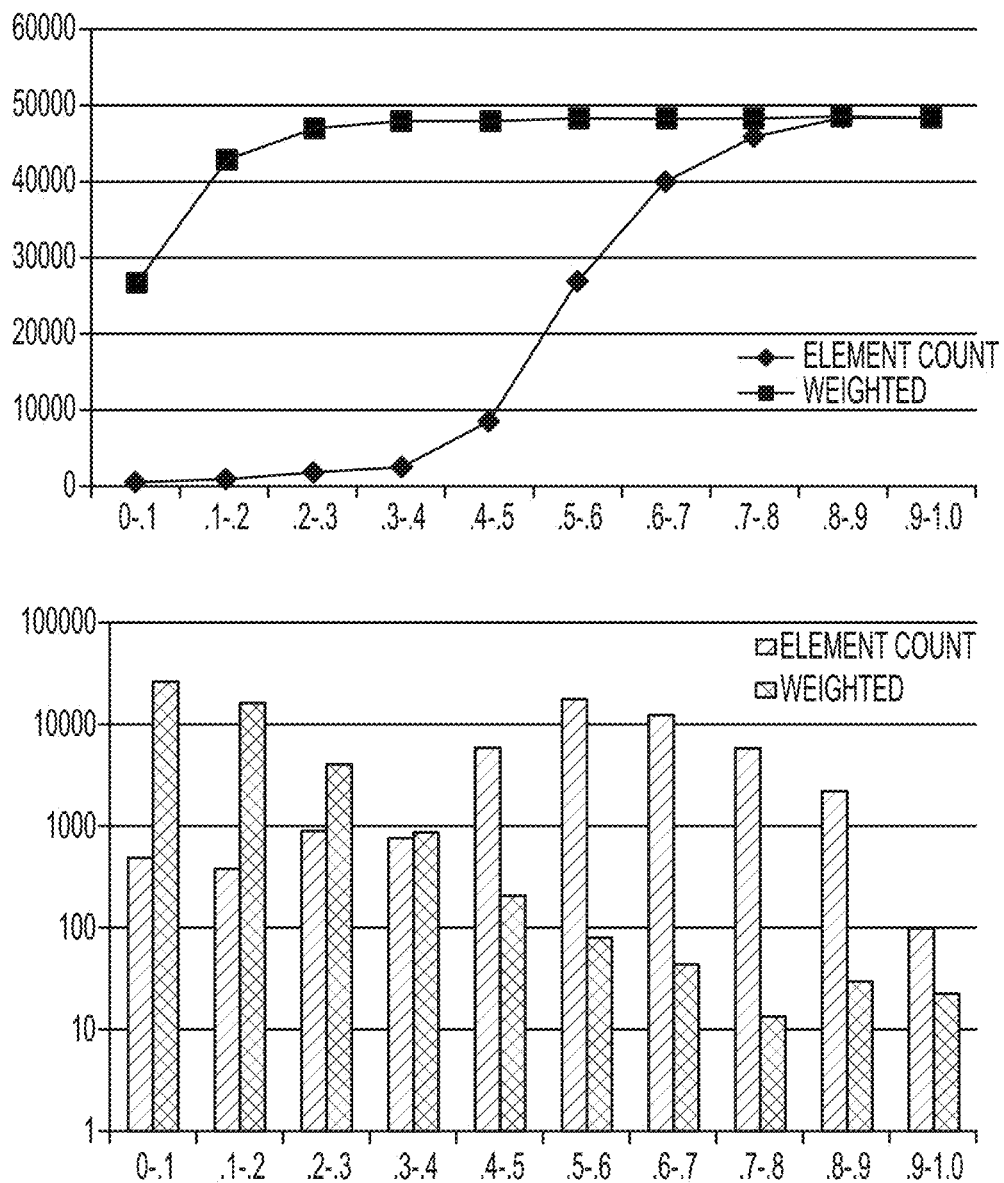
FIG. 11 shows a comparison of the distribution of similarity values using lines in common with weighted similarity in an example data set in one embodiment of the present disclosure.

Weighting greatly reduced the number of systems that appeared very similar, e.g., as shown in FIG. 11. FIG. 11 shows comparing of the distribution of similarity values using lines in common with weighted similarity in an example data set of 220 systems. The top graph illustrates cumulative values and the bottom graph shows distribution values. Weighted similarity provides a reasonable distribution for in generating groups of systems.

Proposing Groups

Efficient clustering algorithms, such as spectral clustering, can find clusters in data from pairwise "distance" metrics. However, there are several factors in the data being clustered to be considered: 1) Some elements are not in any group; 2) Some elements are in more than one group; 3) there is no good guesses for how many groups should be found.

In one embodiment, a methodology of the present disclosure, may use another approach that first selects thresholds for "similar," or "not similar;" then runs a greedy algorithm to propose possible groups. Algorithm II illustrates this approach.

Algorithm II

1) Assign each server an ordinal reference and create a single-element group containing that reference.
2) For each group under evaluation, look for servers with higher ordinal values than all members that are within the similarity threshold to all members.
3) For each match, create a new group containing the superset including the new server.
4) Repeat 2-3 until all groups have been considered against all higher-reference servers.
5) Remove any proper subgroups.

If similarity is defined too generously, the memory required for this algorithm may explode, so it is useful to include a trigger that re-starts with higher thresholds if the number of possible groups grows too large.

Considering Communication

Servers collaborating to provide a single application need to communicate. This fact has been used to augment the similarity metric in proposing server groups. Step 2 in Algorithm II discussed above can be modified to adjust the similarity threshold based on other criteria. For example, the following three communication patterns may be used to determining the likelihood of System A and System B being members of an application group: System A opens communication channels with System B (or vice versa); System A and System B both open communication channels with each other; Some other system opens communication with both System A and System B.

As with different areas in the system description, a methodology of the present disclosure in one embodiment may weigh these different communication dependencies. In one embodiment, one way connections may be ignored, pairs with mutually-initiated connections may be always considered similar, and a lowered (but still non-zero) threshold for similarity may be used for pairs of systems that both receive communication from the same external system.

Application Signatures

The same tool that is able to compare two server definitions in sysconfig.xml is also able to generate a "signature" for any two or more server definitions. This signature contains the elements in common among all components (including the self-reference tokens). FIG. 12 shows the signature that corresponds to the example difference extracted that is shown in FIG. 10. FIG. 12 shows an example signature representing the common elements in two example system descriptions compared in FIG. 10.

In one aspect, once a partial group is known, possibly as the result of an interview with the business owner of an application, these signatures can be useful in finding other servers that were not mentioned. One common cause for such omissions is to list the production servers, and to forget to mention the development and test servers.

This same signature technique is useful in extending groups proposed by similarity-based clustering. Signatures return all servers that match the elements shared among the specified components, overlooking the possibly large number of elements that are not shared. This can help to cut through distracting "noise" in some server descriptions, such as may be caused by a large number of middle-ware products being installed on one group member only.

Evaluating Correctness

In one aspect, a process that compares discovered Business Application (BizApp) associations may be performed in two steps. The associations or groupings of systems identified by the BizApp discovery method may be first compared to the initial inputs provided by the business application owner or customer. The initial inputs include a business application name or ID and a list of known server nodes that provide a service relevant to the functionality of the application. This is called the app to server mapping. Any deltas in the server list of this mapping are marked for reconciliation in the second step of the validation.

The second step includes an interview session with the business application owners. The goal of the interview is to gather a basic functional understanding of the BizApp, a classification of the service provided by each of the servers (e.g., web, Database, messaging, etc.), an environment designation such as production, and any component details. Component details may include middleware applications, database names, services and ports utilized by the BizApp. Once the data elements are captured the information is input and an updated grouping is produced. The updated grouping also includes any inferred dependencies that were deemed relevant by the application owner during the interview. In contrast any dependencies not relevant are filtered and absent in the updated grouping. The final grouping, services and associated data stores is then verified by the business application owner(s).

As described above, in another aspect of the present disclosure, a methodology may be provided for identifying a business application. The methodology may be implemented on a computer system. The methodology may include receiving an input with a list of servers and their performance characteristics and signatures. The methodology may also include identifying configuration and communication patterns between servers, e.g., where one of the features to be considered includes server type. The methodology may also include returning a list of potential application patterns, server groups and other profiles. As an embodiment, this methodology and/or system may incorporate active learning, to engage subject matter experts (SMEs) and improve the recommendation precision and generate pattern templates. The methodology in one embodiment may be used in or as a system that provides migration support to a customer, and for example, guide them through application discovery process.

The methodology for application discovery, in one aspect, provides for an automated method for discovering server similarity as part of application identification process. It may include a learning component that captures repeatable patterns in business applications (e.g., large scale applications, custom applications, etc.), e.g., incorporated as a feedback loop into business application discovery.

The methodology may provide for a mechanism for handling newly discovered types of applications and server groups. Frequency and type of server connectivity may be considered as possible parameters in an application discovery process.

An automated application (e.g., business application) discovery methodology in one aspect may improve migration planning, e.g., accelerate wave allocation and planning, and/or reduce and/or remove conflicts in system environment at migration time.

Figure 13:
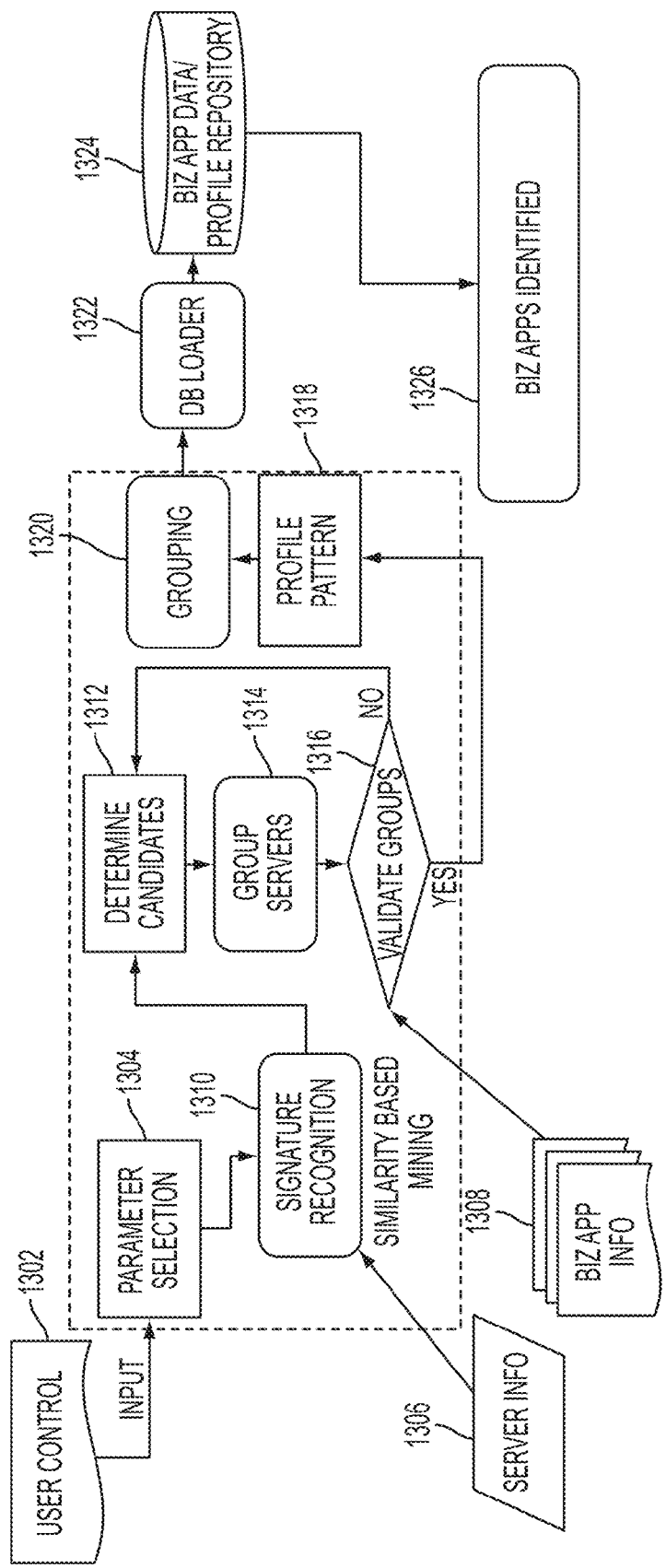
FIG. 13 is a flow diagram illustrating an overview of a process for automated application discovery in one embodiment of the present disclosure.

FIG. 13 is a flow diagram illustrating an overview of a process for automated application discovery in one embodiment of the present disclosure. User control component 1302 may include one or more selection criteria, rules, thresholds and known signatures applied to a grouping engine for parameter selection 1304. Server Information component 1306 may include server parameters, utilization metrics, dependency information and application patterns provided from automated data collection and processing system (e.g., ALDM sysconfig.xml). Business Application information 1308 may include client sourced information, e.g., environment, business application composition, known server residencies.

Signature Recognition component 1310 may include a process to assemble a set of attributes (e.g., server attributes) that have similarities to other nodes (e.g., servers) in dataset of study. For example, as described above, similarity determination algorithm (e.g., Algorithm I) may use a weighted method in one embodiment of the present disclosure. Based on a host summary such as the sysconfig.xml generated by ALDM, an algorithm in one embodiment may construct a scalar measure of similarity between all pairs of systems. Common elements discovered in the system configuration files of pairs of systems may be matched up. The algorithm in one embodiment may divide the total number of elements appearing in both systems in a pair of systems (x2 for both occurrences) by the total number of elements defined (discovered) in both systems. In a weighted method, some element trees count for more than one. Weights may be assigned before running the division computation. Assigned weights (values) may be based on expert domain knowledge. Any text in the server description that matches (e.g., ignoring case) the server's own name may be converted to a marker that is considered to match similar markers from other descriptions. These occur most commonly in a Uniform Resource Locator (URL) (e.g., a file on a local disk) or in a file path (e.g., common in WebSphere® Application Server installations).

Thus, for example, determining a similarity measure between a pair of the plurality of servers that include a first server and a second server may be performed by analyzing a system description data (e.g., sysconfig.xml) associated with the first server and the second server. The analyzing may include at least assigning weights to sections of the system description data, determining a number of common elements between the system description data associated with the first server and the second server, using the weights as multipliers for the common elements contained in the respective sections, wherein the similarity measure is determined based on the weighted common elements occurring in the system description data associated with the first server and the second server.

Determine Candidates component 1312 may include a process that identifies the candidate for inclusion in a group. Group Servers component 1314 may group the servers and present an initial finding. In one embodiment of the present disclosure, the grouping may include an approach that first selects thresholds for "similar," or "not similar", then runs a greedy algorithm to propose possible groups, e.g., described above as Algorithm II.

At this stage, some servers may be too well-connected. In this case, a methodology in one embodiment of the present disclosure may define a maximum number of groups with which a server may be associated without being "infrastructure." After running a grouping algorithm once, the systems contained in more than this many groups may be identified and added to an "ignore list." The grouping algorithm may be re-run without considering these systems.

Another example of a grouping algorithm may be as follows:

(1) Perform a base similarity measure using the weighted algorithm described above with reference to Algorithm I.

(2) Machines A and B are considered "groupable" if they meet any one or more criteria. Examples of criteria may include a weighted similarity exceeding a threshold number. For example:
  a. WeightedSimilarity >60%;
  b. WeightedSimilarity >30% and some third machine X connects to both A and B;
  c. A connects to B and B connects to A;
  d. Other criteria may be considered.

(3) Greedy algorithm builds the largest possible sets of groupable machines such that every pair in the group meets at least one of the conditions in (2).

In one aspect, a second pass may be useful that identifies multiple arrangements of the same base members, then merges them. After identifying a probable group, a "signature" may be generated that comprises the elements that servers have in common. This signature may be matched against all other known servers to identify further group members.

Validate Groups component 1316 may optionally validate group(s) with client or other informed source. If, for example, this component validates the grouping resulting at 1314, the processing may move to final grouping, e.g., to 1318. If it is decided to further refine the grouping, for example, as a result of validation at 1316, information learned from client sourced data (e.g., 1308) may be used to reprocess a grouping at 1312.

Profile pattern component 1318 may identify the valid signature pattern over the entire environment. Grouping component 1320 includes final grouping results.

DB Loader component 1322 may include a process to load Data Repository 1324. Data Repository 1324 may include a database and metadata container for managing content rich images and other textual data. Biz Apps Identified 1326 component may include visual renderings and textual data illustrating business application collection. Such renderings and/or textual data may be provided via a user interface (e.g., graphical user interface) of a computer system of the present disclosure in one embodiment.

In one aspect, the groups of servers identified in the automated application discovery in one embodiment of the present disclosure described above may be utilized in provisioning planning of enterprise migration, e.g., described above, e.g., with reference to FIG. 5. For example, the virtual machines mapped to servers may be further grouped based on business application discovery results that identify servers in the plurality of servers that work together to deliver a single business application.

Figure 14:
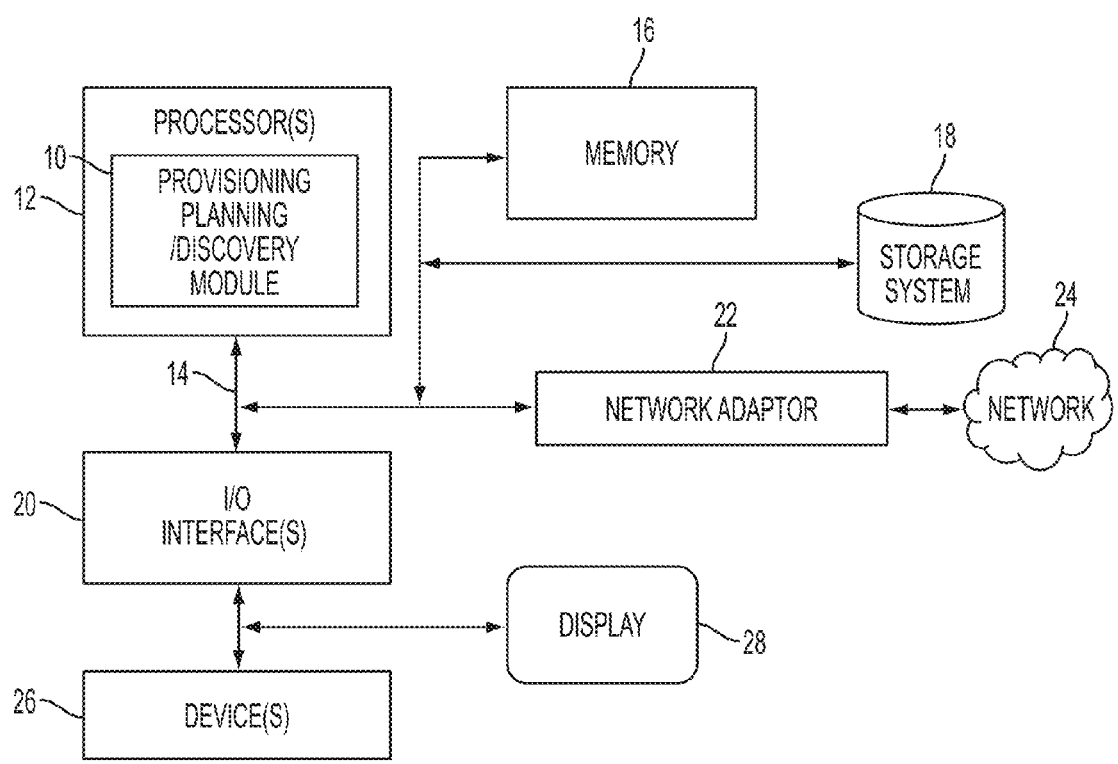
FIG. 14 illustrates a schematic of an example computer or processing system that may implement a provisioning planning and/or application discover system in one embodiment of the present disclosure.

FIG. 14 illustrates a schematic of an example computer or processing system that may implement a provisioning planning and/or application discovery system in one embodiment of the present disclosure. The computer system is only one example of a suitable processing system and is not intended to suggest any limitation as to the scope of use or functionality of embodiments of the methodology described herein. The processing system shown may be operational with numerous other general purpose or special purpose computing system environments or configurations. Examples of well-known computing systems, environments, and/or configurations that may be suitable for use with the processing system shown in FIG. 14 may include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

The computer system may be described in the general context of computer system executable instructions, such as program modules, being executed by a computer system. Generally, program modules may include routines, programs, objects, components, logic, data structures, and so on that perform particular tasks or implement particular abstract data types. The computer system may be practiced in distributed cloud computing environments where tasks are performed by remote processing devices that are linked through a communications network. In a distributed cloud computing environment, program modules may be located in both local and remote computer system storage media including memory storage devices.

The components of computer system may include, but are not limited to, one or more processors or processing units 12, a system memory 16, and a bus 14 that couples various system components including system memory 16 to processor 12. The processor 12 may include a module 10 that performs the methods described herein. The module 10 may be programmed into the integrated circuits of the processor 12, or loaded from memory 16, storage device 18, or network 24 or combinations thereof.

Bus 14 may represent one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system may include a variety of computer system readable media. Such media may be any available media that is accessible by computer system, and it may include both volatile and non-volatile media, removable and non-removable media.

System memory 16 can include computer system readable media in the form of volatile memory, such as random access memory (RAM) and/or cache memory or others. Computer system may further include other removable/non-removable, volatile/non-volatile computer system storage media. By way of example only, storage system 18 can be provided for reading from and writing to a non-removable, non-volatile magnetic media (e.g., a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 14 by one or more data media interfaces.

Computer system may also communicate with one or more external devices 26 such as a keyboard, a pointing device, a display 28, etc.; one or more devices that enable a user to interact with computer system; and/or any devices (e.g., network card, modem, etc.) that enable computer system to communicate with one or more other computing devices. Such communication can occur via Input/Output (I/O) interfaces 20.

Still yet, computer system can communicate with one or more networks 24 such as a local area network (LAN), a general wide area network (WAN), and/or a public network (e.g., the Internet) via network adapter 22. As depicted, network adapter 22 communicates with the other components of computer system via bus 14. It should be understood that although not shown, other hardware and/or software components could be used in conjunction with computer system. Examples include, but are not limited to: microcode, device drivers, redundant processing units, external disk drive arrays, RAID systems, tape drives, and data archival storage systems, etc.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

We claim:

1. A method of resource provisioning planning, comprising:
   receiving source site data comprising parameters associated with a source site, the source site comprising information technology infrastructure of an enterprise, the information technology infrastructure comprising at least a plurality of servers and a plurality of applications;
   discovering network dependencies between the plurality of servers of the source site;
   discovering application instances and dependencies on the plurality of servers, based on a weighted similarity metric;
   identifying one or more server misconfigurations;
   determining potential server consolidation;
   determining a target platform for migrating the plurality of servers;
   mapping each of the plurality of servers to a virtual machine of a plurality of virtual machines subject to resource constraints of the servers and the virtual machines;
   clustering the virtual machines based on network dependencies of the servers mapped to the virtual machines;
   determining whether an existing target server can fit a candidate cluster;
   responsive to determining that the existing target server can fit the candidate cluster, placing the candidate cluster on the existing target server;
   responsive to determining that the existing target server cannot fit the candidate cluster, selecting a new target server to fit the candidate cluster with minimum cost; and
   repeating the determining of whether an existing target server can fit a candidate cluster, one or more of the placing and the selecting, for a next candidate cluster.

2. The method of claim 1, wherein the parameters comprise one or more of command line tool output, middleware dependency data associated with the plurality of servers discover using an automated discovery tool, utilization information associated with the information technology infrastructure, hardware specifications associated with the information technology infrastructure, application information associated with the information technology infrastructure, and log output associated with the information technology infrastructure.

3. The method of claim 1, wherein the discovering network dependencies comprises analyzing active sockets and middleware dependencies.

4. The method of claim 3, further comprising scoring weight for each of the network dependencies.

5. The method of claim 4, wherein the scoring is based on at least one of:
   a level of socket activity;
   a number of active sockets;
   duration of socket length; and
   a number of middleware dependencies.

6. The method of claim 1, wherein the clustering of the virtual machines is based on modularity technique.

7. The method of claim 1, wherein the identifying one or more server misconfigurations comprises analyzing sockets, dropped packets and incorrect checksums, system logs, or application logs, or combinations thereof.

8. The method of claim 1, wherein the determining potential server consolidation comprises identifying servers from the plurality of servers that are running a same operating system and version, and that do not have overlapping open ports and running applications.

9. The method of claim 8, further comprising consolidating the identified servers based on target cost and performance.

10. The method of claim 1, wherein the virtual machines is further grouped based on business application discovery results that identify servers in the plurality of servers that work together to deliver a single business application.

11. A system of resource provisioning planning, comprising:
   a hardware processor,
   a storage device storing source site data comprising parameters associated with a source site, the source site comprising information technology infrastructure of an enterprise, the information technology infrastructure comprising at least a plurality of servers and a plurality of applications;
   the hardware processor discovering network dependencies between the plurality of servers of the source site,
   the hardware processor identifying one or more server misconfigurations,
   the hardware processor determining candidate server consolidation,
   the hardware processor determining a target platform for migrating the plurality of servers,
   the hardware processor mapping each of the plurality of servers to a virtual machine of a plurality of virtual machines subject to resource constraints of the servers and the virtual machines,
   the hardware processor clustering the virtual machines based on network dependencies of the servers mapped to the virtual machines,
   the hardware processor determining whether an existing target server can fit a candidate cluster,
   responsive to determining that the existing target server can fit the candidate cluster, the hardware processor placing the candidate cluster on the existing target server,
   responsive to determining that the existing target server cannot fit the candidate cluster, the hardware processor selecting a new target server to fit the candidate cluster with minimum cost, and
   the hardware processor repeating the determining of whether an existing target server can fit a candidate cluster, one or more of the placing and the selecting, for a next candidate cluster.

12. The system of claim 11, wherein the parameters comprise one or more of command line tool output, middleware dependency data associated with the plurality of servers discover using an automated discovery tool, utilization information associated with the information technology infrastructure, hardware specifications associated with the information technology infrastructure, application information associated with the information technology infrastructure, and log output associated with the information technology infrastructure.

13. The system of claim 11, wherein the hardware processor discovers network dependencies by analyzing active sockets and middleware dependencies, wherein the processor scores a weight for each of the network dependencies, wherein the scores are based on at least one of:
   a level of socket activity;
   a number of active sockets;
   duration of socket length; and
   a number of middleware dependencies.

14. The system of claim 11, wherein the clustering of the virtual machines is based on modularity technique.

15. The system of claim 11, wherein the hardware processor identifies one or more server misconfigurations by analyzing at least one of sockets, dropped packets and incorrect checksums, system logs, and application logs.

16. The system of claim 11, wherein the hardware processor determines the candidate server consolidation by identifying servers from the plurality of servers that are running a same operating system and version, and that do not have overlapping open ports and running applications, and the hardware processor consolidates the identified servers based on target cost and performance.

17. A non-transitory computer readable storage medium storing a program of instructions executable by a machine to perform a method of automating business application discovery, the method comprising:
   receiving a system description data associated with a server of a plurality of servers in an information technology infrastructure of an enterprise, for each of the plurality of servers;
   determining a similarity measure between a pair of the plurality of servers comprising a first server and a second server, by analyzing the system description data associated with the first server and the second server, the analyzing comprising at least:
      assigning weights to sections of the system description data;
      determining a number of common elements between the system description data associated with the first server and the second server; and
      using the weights as multipliers for the common elements contained in the respective sections, wherein the similarity measure is determined based on the weighted common elements occurring in the system description data associated with the first server and the second server; and
   grouping the plurality of servers into a plurality of groups based on the similarity measure and at least a greedy algorithm,
   wherein migration of the plurality of servers are planned based at least on the plurality of groups.

18. The computer readable storage medium of claim 17, wherein the system description data is generated using an infrastructure discovery tool, and provided in an extensible markup language format.

19. The computer readable storage medium of claim 17, further comprising generating an application signature representing the common elements in the system description data.

20. The computer readable storage medium of claim 17, further comprising validating the plurality of groups using domain knowledge.

* * * * *